(12) United States Patent
Wang et al.

(10) Patent No.: US 12,713,440 B2
(45) Date of Patent: Aug. 18, 2026

(54) USER EQUIPMENT CONFIGURED FOR STAYING ON COMPONENT CARRIER DURING SRS CARRIER SWITCHING IN 5G NETWORKS

(71) Applicant: Intel Corporation, Santa Clara, CA (US)

(72) Inventors: Guotong Wang, Beijing (CN); Alexei Davydov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 393 days.

(21) Appl. No.: 18/283,317

(22) PCT Filed: Jul. 11, 2022

(86) PCT No.: PCT/US2022/036660

§ 371 (c)(1),
(2) Date: Sep. 21, 2023

(87) PCT Pub. No.: WO2023/287694

PCT Pub. Date: Jan. 19, 2023

(65) Prior Publication Data

US 2024/0178976 A1 May 30, 2024

(30) Foreign Application Priority Data

Jul. 14, 2021 (WO) ................ PCT/CN2021/106165
Aug. 6, 2021 (WO) ................ PCT/CN2021/111217
(Continued)

(51) Int. Cl.
*H04W 72/232* (2023.01)
*H04L 5/00* (2006.01)

(52) U.S. Cl.
CPC .......... *H04W 72/232* (2023.01); *H04L 5/001* (2013.01); *H04L 5/0048* (2013.01)

(58) Field of Classification Search
CPC .......... H04W 72/23–232; H04L 5/001; H04L 5/0048
See application file for complete search history.

(56) References Cited

U.S. PATENT DOCUMENTS

2017/0332370 A1* 11/2017 Rico Alvarino ........ H04L 5/001
2018/0287682 A1 10/2018 Kwak et al.
(Continued)

FOREIGN PATENT DOCUMENTS

JP 2019514268 5/2019
JP 2024516344 4/2024
(Continued)

OTHER PUBLICATIONS

"Japanese Application Serial No. 2023-554036, Notification of Reasons for Refusal mailed Oct. 1, 2024", w English translation, 11 pgs.

(Continued)

*Primary Examiner* — Kevin C. Harper
(74) *Attorney, Agent, or Firm* — Schwegman Lundberg & Woessner, P.A.

(57) ABSTRACT

An apparatus and system are described to provide carrier switching rules for multiple aperiodic Sounding Reference Signals (SRS) resource sets triggered by a single downlink control information (DCI). Whether the user equipment (UE) retunes between a source component carrier (CC) and a target CC for an SRS transmission is dependent on a time period between adjacent SRS resource sets in addition to priorities of the SRS transmission on the target CC and a simultaneous transmission on the source CC. In addition, timing of another DCI scheduling the simultaneous transmission received prior to the associated SRS transmission affects which of the simultaneous transmission or the associated SRS transmission is transmitted.

18 Claims, 23 Drawing Sheets

(30) Foreign Application Priority Data

Sep. 30, 2021 (WO) ................ PCT/CN2021/122089
Nov. 5, 2021 (WO) ................ PCT/CN2021/128966

(56) References Cited

U.S. PATENT DOCUMENTS

2020/0267026 A1* 8/2020 Manolakos ........... H04W 72/23
2020/0344700 A1 10/2020 Lee et al.

FOREIGN PATENT DOCUMENTS

JP 7651815 3/2025
WO WO-2023287694 A1 1/2023

OTHER PUBLICATIONS

ZTE, "Discussion on SRS carrier switching", R1-2104580 3GPP TSG RAN WG1 Meeting #105-e R1-2104580 e-Meeting, May 10-27, [Online]. Retrieved from the Internet: https: www.3gpp.org ftp tsg_ran WG1_RL1 TSGR1J05-e Docs R12104580.zip, (May 12, 2021), 5 pgs.

"104-e-NR-TxSwitching-01] Summary of email discussion on maintenance of Rel-16 uplink Tx switching", Moderator (China Telecom), R1-2102149, 3GPP TSG RAN WG1 #104-e, e-Meeting, (Feb. 8, 2021).

"Discussion on SRS carrier switching", Qualcomm Incorporated, R1-2104647, 3GPP TSG RAN WG1 #105-e, e-Meeting, (May 12, 2021).

"Discussion on SRS enhancement", Qualcomm Incorporated, R1-2103155, 3GPP TSG-RAN WG1 Meeting #104bis-e, e-Meeting, (Apr. 7, 2021).

"International Application Serial No. PCT/US2022/036660, International Search Report mailed Oct. 31, 2022", 4 pgs.

"International Application Serial No. PCT/US2022/036660, Written Opinion mailed Oct. 31, 2022", 4 pgs.

"International Application Serial No. PCT/US2022/036660, International Preliminary Report on Patentability mailed Jan. 25, 2024", 6 pgs.

Intel, Corporation, "Discussion on SRS carrier switching", 3GPP T SG RAN WG1 #106-e R1-2107567, [Online]. Retrieved from the Internet: https www.3gpp.org ftp tsg_ran WG1_RL1 TSGR1_106-e Docs R1-2107567.zip, (2021), 4 pgs.

"Korean Application Serial No. 10-2023-7032945, Voluntary Amendment Filed Jul. 11, 2025", w/ English Claims, 20 pgs.

* cited by examiner (ΔT2 could be the same as ΔT1)

LP: Low priority; HP: High priority

Both SRS sets are sent over target CC. UE stay in target CC during ΔT

LP: Low priority; HP: High priority

SRS set #A is dropped. UE switch target CC to send SRS set #B

SRS resource set #A is periodic
SRS resource set #B is aperiodic

SRS resource set #A is periodic
SRS resource set #B is aperiodic (ΔT2 could be the same as ΔT1)

K1 is the deadline to consider DCI for collision handling for SRS set #A
K2 is the deadline to consider DCI for collision handling for SRS set #B LP: Low priority; HP: High priority SRS set #A is sent. UE will ignore the high priority signal in source CC to send SRS set #B K1 is the deadline to consider DCI for collision handling for both SRS set #A and SRS set #B (ΔT2 could be the same as ΔT1)

LP: Low priority; HP: High priority

SRS set #A is sent. UE will ignore the high priority signal in source CC

DCI format 2_3: *srs-TPCPDCCH-Group* set to *typeA*

DCI format 2_3: *srs-TPCPDCCH-Group* set to *typeB*

USER EQUIPMENT CONFIGURED FOR STAYING ON COMPONENT CARRIER DURING SRS CARRIER SWITCHING IN 5G NETWORKS

PRIORITY CLAIM

This application is a U.S. National Stage Filing under 35 U.S.C. 371 from International Application No. PCT/US2022/036660, filed Jul. 11, 2022 and published in English as WO 2023/287694 on Jan. 19, 2023, which claims the benefit of priority to International Application No. PCT/CN2021/106165, filed Jul. 14, 2021, International Application No. PCT/CN2021/111217, filed Aug. 6, 2021, International Application No. PCT/CN2021/122089, filed Sep. 30, 2021, and International Application No. PCT/CN2021/128966, filed Nov. 5, 2021, each of which is incorporated herein by reference in its entirety.

TECHNICAL FIELD

Embodiments pertain to next generation (NG) wireless communications. Some embodiments relate to reference signals, and, in particular, Sounding Reference Signals (SRS). In particular, some embodiments related to switching carriers for transmission of SRS.

BACKGROUND

The use and complexity of new radio (NR) wireless systems, which include $5^{th}$ generation (5G) networks and are starting to include sixth generation (6G) networks among others, has increased due to both an increase in the types of devices UEs using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated. As expected, a number of issues abound with the advent of any new technology. In particular, in performing sounding, control of component carrier (CC) switching for SRS transmission is to be fully established.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
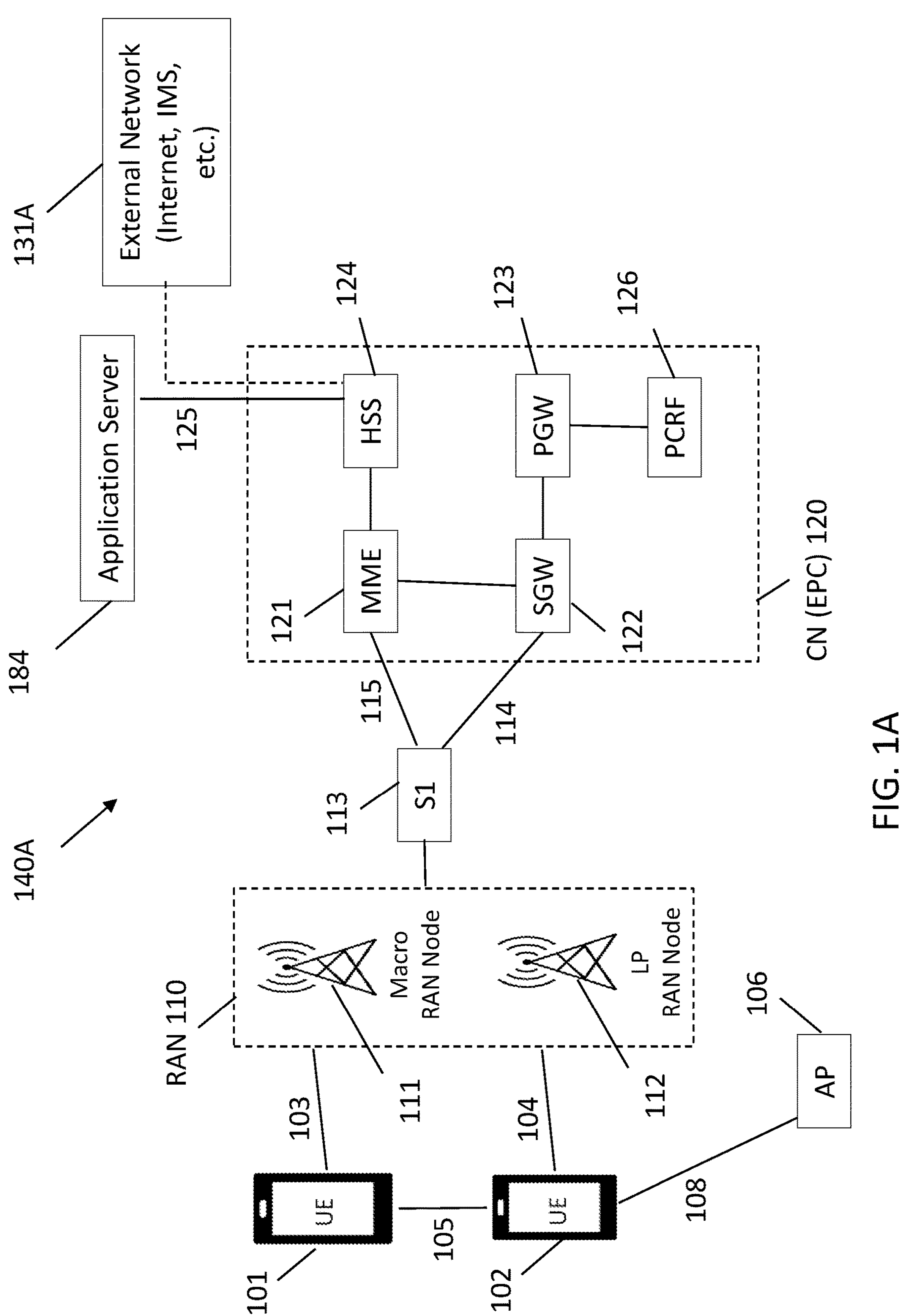
FIG. 1A illustrates an architecture of a network, in accordance with some aspects.

FIG. 1A illustrates an architecture of a network in accordance with some aspects. Note that while the network 140A generally shows the architecture of a 5G public network, one or more elements of the 5G public network may be present in a private 5G network, as discussed in more detail below. The network 140A includes 3GPP LTE/4G and NG network functions that may be extended to 6G functions. Accordingly, although 5G will be referred to, it is to be understood that this is to extend as able to 6G structures, systems, and functions. A network function may be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 may be collectively referred to herein as UE 101, and UE 101 may be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHZ, 3.6-3.8 GHz, and other frequencies and Spectrum Access System (SAS) in 3.55-3.7 GHZ and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 may comprise an Internet-of-Things (IoT) UE or a Cellular IoT (CIoT) UE, which may comprise a network access layer designed for low-power IoT applications utilizing short-lived UE connections. In some aspects, any of the UEs 101 and 102 may include a narrowband (NB) IoT UE (e.g., such as an enhanced NB-IoT (eNB-IoT) UE and Further Enhanced (FeNB-IoT) UE). An IoT UE may utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 may include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and may be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, a Wi-Fi protocol, and the like. Accordingly, the UEs 101 and 102 may contain both a 3GPP (5G) modem and a separate Wi-Fi modem.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 108. The connection 108 may comprise a local wireless connection, such as, for example, a connection consistent with any IEEE 802.11 protocol, according to which the AP 106 may comprise a wireless fidelity (WiFi®) router. In this example, the AP 106 is shown to be connected to the Internet without connecting to the core network of the wireless system (described in further detail below).

The RAN 110 may include one or more access nodes that enable the connections 103 and 104. These access nodes (ANs) may be referred to as base stations (BSs), NodeBs, evolved NodeBs (eNBs), Next Generation NodeBs (gNBs), RAN nodes, and the like, and may comprise ground stations (e.g., terrestrial access points) or satellite stations providing coverage within a geographic area (e.g., a cell). In some aspects, the communication nodes 111 and 112 may be transmission/reception points (TRPs). In instances when the communication nodes 111 and 112 are NodeBs (e.g., eNBs or gNBs), one or more TRPs may function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 may terminate the air interface protocol and may be the first point of contact for the UEs 101 and 102. In some aspects, any of the RAN nodes 111 and 112 may fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 may be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 may provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 may also communicate data to other external networks 131A, which may include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 may also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A may be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum. Further enhanced operation of LTE systems in the licensed as well as unlicensed spectrum is expected in future releases and 5G systems. Such enhanced operations may include techniques for sidelink resource allocation and UE processing behaviors for NR sidelink V2X communications.

An NG system architecture (or 6G system architecture) may include the RAN 110 and a 5G core network (5GC) 120. The NG-RAN 110 may include a plurality of nodes, such as gNBs and NG-eNBs. The CN 120 (e.g., a 5G core network/5GC) may include an access and mobility function (AMF) and/or a user plane function (UPF). The AMF and the UPF may be communicatively coupled to the gNBs and the NG-eNBs via NG interfaces. More specifically, in some aspects, the gNBs and the NG-eNBs may be connected to the AMF by NG-C interfaces, and to the UPF by NG-U interfaces. The gNBs and the NG-eNBs may be coupled to each other via Xn interfaces.

In some aspects, the NG system architecture may use reference points between various nodes. In some aspects, each of the gNBs and the NG-eNBs may be implemented as a base station, a mobile edge server, a small cell, a home eNB, and so forth. In some aspects, a gNB may be a master node (MN) and NG-eNB may be a secondary node (SN) in a 5G architecture.

Figure 1B:
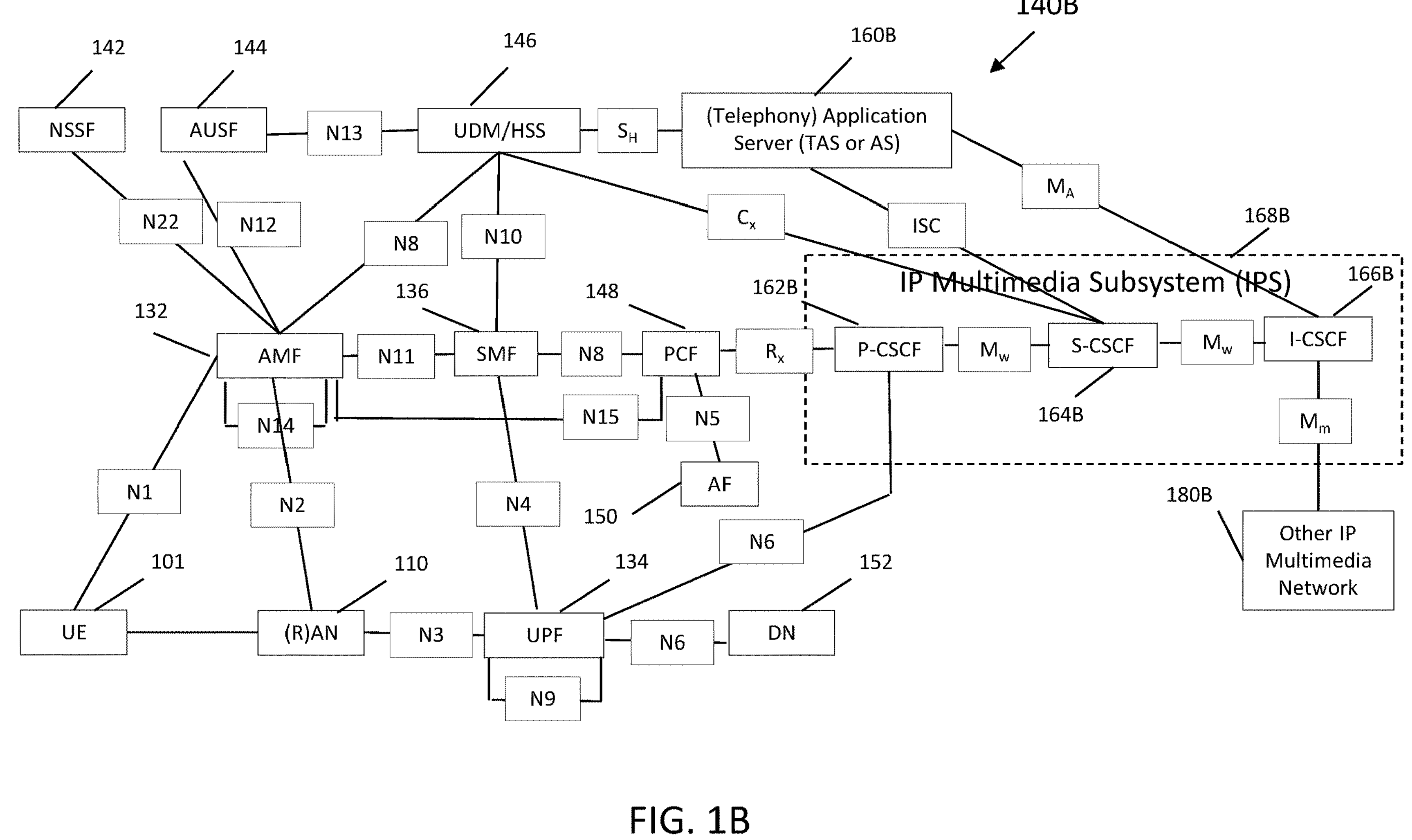
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 may be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 may provide a connection to a data network (DN) 152, which may include, for example, operator services, Internet access, or third-party services. The AMF 132 may be used to manage access control and mobility and may also include network slice selection functionality. The AMF 132 may provide UE-based authentication, authorization, mobility management, etc., and may be independent of the access technologies. The SMF 136 may be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 may be deployed in one or more configurations according to the desired service type and may be connected with a data network. The PCF 148 may be configured to provide a policy framework using network slicing, mobility management, and roaming (similar to PCRF in a 4G communication system). The UDM may be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which may act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B may be configured to be the first contact point for the UE 102 within the IM subsystem (IMS) 168B. The S-CSCF 164B may be configured to handle the session states in the network, and the E-CSCF may be configured to handle certain aspects of emergency sessions such as routing an emergency request to the correct emergency center or PSAP. The I-CSCF 166B may be configured to function as the contact point within an operator's network for all IMS connections destined to a subscriber of that network operator, or a roaming subscriber currently located within that network operator's service area. In some aspects, the I-CSCF 166B may be connected to another IP multimedia network 180E, e.g., an IMS operated by a different network operator.

In some aspects, the UDM/HSS 146 may be coupled to an application server, which may include a telephony application server (TAS) or another application server (AS). The AS 160B may be coupled to the IMS 168B via the S-CSCF 164B or the I-CSCF 166B.

A reference point representation shows that interaction may exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B may also be used.

Figure 1C:
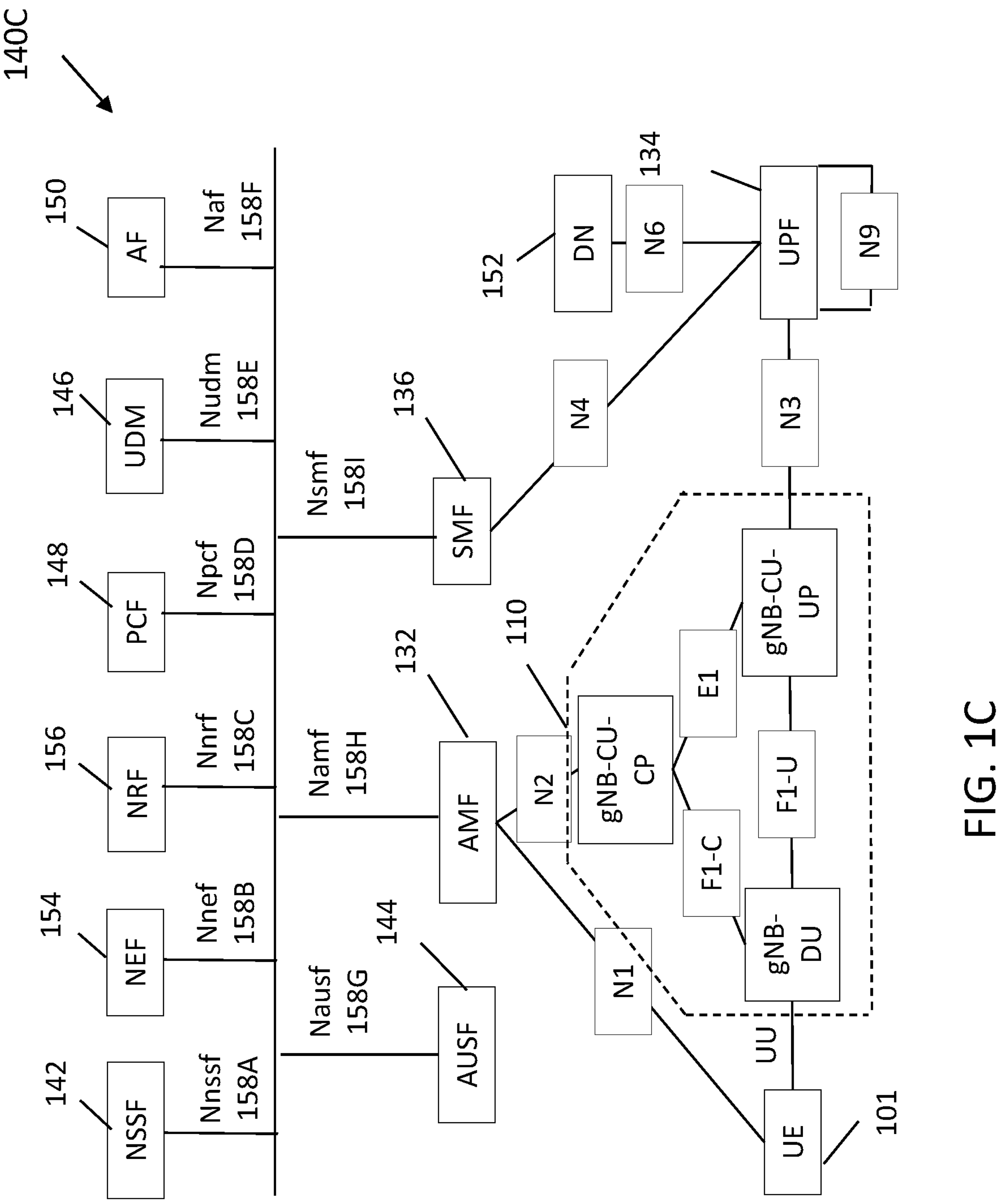
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C may also include a network exposure function (NEF) 154 and a network repository function (NRF) 156. In some aspects, 5G system architectures may be service-based and interaction between network functions may be represented by corresponding point-to-point reference points Ni or as service-based interfaces.

In some aspects, as illustrated in FIG. 1C, service-based representations may be used to represent network functions within the control plane that enable other authorized network functions to access their services. In this regard, 5G system architecture 140C may include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C may also be used.

NR-V2X architectures may support high-reliability low latency sidelink communications with a variety of traffic patterns, including periodic and aperiodic communications with random packet arrival time and size. Techniques disclosed herein may be used for supporting high reliability in distributed communication systems with dynamic topologies, including sidelink NR V2X communication systems.

Figure 2:
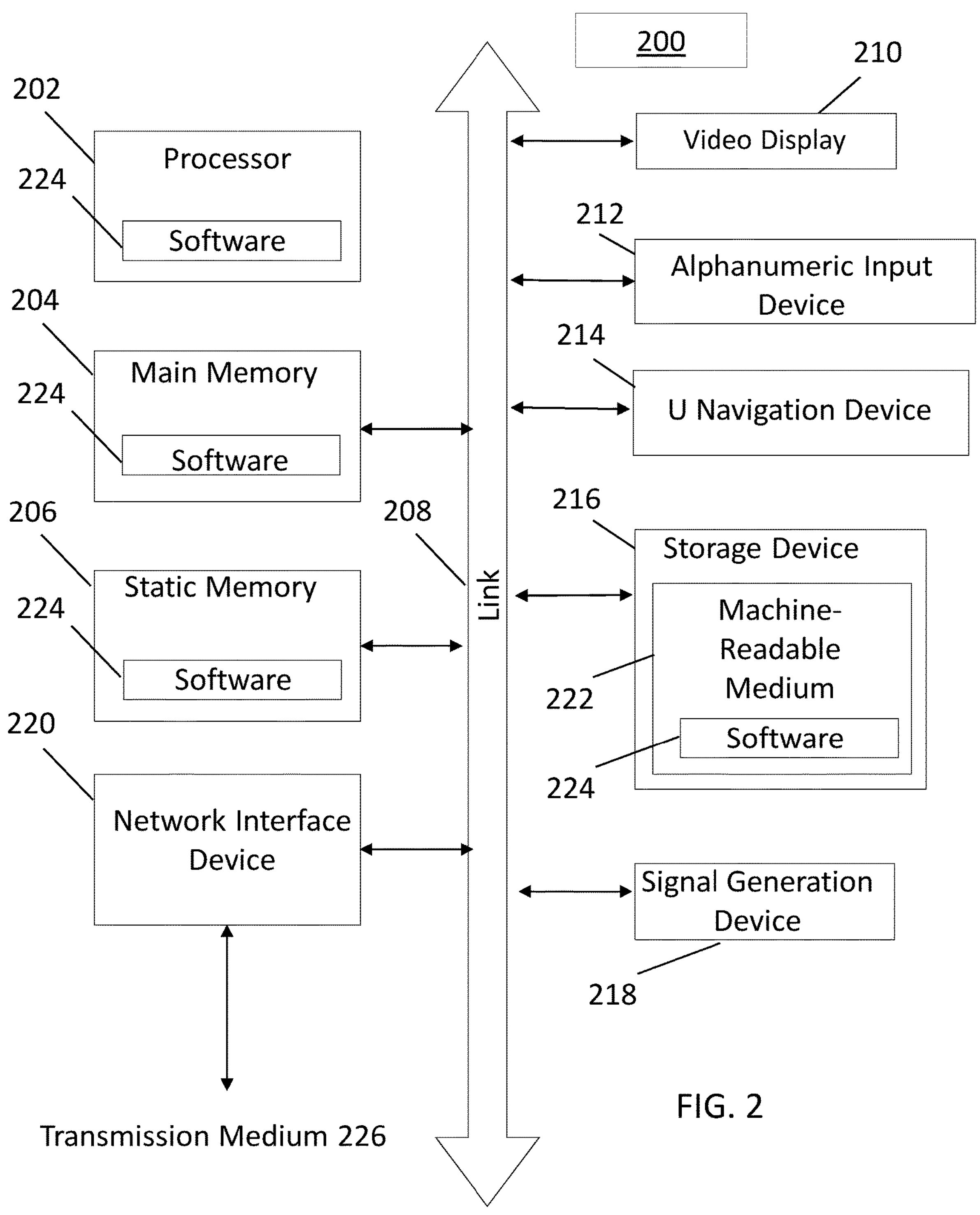
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5th generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (12V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHZ), ITS-G5B (i.e., Operation in European ITS frequency bands dedicated to ITS non-safety applications in the frequency range 5,855 GHz to 5,875 GHZ), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Aspects described herein may be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHZ, 3.6-3.8 GHz and further frequencies and SAS=Spectrum Access System/CBRS=Citizen Broadband Radio System in 3.55-3.7 GHZ and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHZ, 1710-2025 MHz, 2110-2200 MHZ, 2300-2400 MHZ, 2.4-2.4835 GHz (note: it is an ISM band with global availability and it is used by Wi-Fi technology family (11b/g/n/ax) and also by Bluetooth), 2500-2690 MHZ, 698-790 MHZ, 610-790 MHz, 3400-3600 MHZ, 3400-3800 MHZ, 3800-4200 MHz, 3.55-3.7 GHZ (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHZ, 3800-4200 MHZ, 3.5 GHz bands, 700 MHz bands, bands within the 24.25-86 GHz range, etc.), spectrum made available under FCC's "Spectrum Frontier" 5G initiative (including 27.5-28.35 GHZ, 29.1-29.25 GHZ, 31-31.3 GHZ, 37-38.6 GHZ, 38.6-40 GHz, 42-42.5 GHZ, 57-64 GHz, 71-76 GHZ, 81-86 GHz and 92-94 GHZ, etc), the ITS (Intelligent Transport Systems) band of 5.9 GHZ (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHZ) and WiGig Band 4 (63.72-65.88 GHZ), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme may be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein may also implement a hierarchical application of the scheme is possible, e.g., by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc.

Aspects described herein may also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

Some of the features in this document are defined for the network side, such as APs, eNBs, NR or gNBs—note that this term is typically used in the context of 3GPP 5G and 6G communication systems, etc. Still, a UE may take this role as well and act as an AP, eNB, or gNB; that is some or all features defined for network equipment may be implemented by a UE.

As above, in the NR Rel-15 specification, different types of SRS resource sets are supported. The SRS resource set is configured with a parameter of 'usage', which may be set to 'beamManagement', 'codebook', 'nonCodebook' or 'antennaSwitching'. The SRS resource set configured for 'beamManagement' is used for beam acquisition and uplink beam indication using SRS. The SRS resource set configured for 'codebook' and 'nonCodebook' is used to determine the UL precoding with explicit indication by transmission precoding matrix index (TPMI) or implicit indication by SRS resource index (SRI). Finally, the SRS resource set configured for 'antennaSwitching' is used to acquire DL channel state information (CSI) using SRS measurements in the UE by leveraging reciprocity of the channel in time domain duplexing (TDD) systems. For SRS transmission, the time domain behavior may be periodic, semi-persistent or aperiodic. The RRC configuration for the SRS resource set is:

```
SRS-ResourceSet ::=                SEQUENCE {
  srs-ResourceSetId                  SRS-ResourceSetId,
  srs-ResourceIdList                 SEQUENCE (SIZE(1..maxNrofSRS-
ResourcesPerSet)) OF SRS-ResourceId        OPTIONAL, -- Cond Setup
  resourceType                     CHOICE {
    aperiodic                      SEQUENCE {
      aperiodicSRS-ResourceTrigger          INTEGER (1..maxNrofSRS-
TriggerStates-1),
      csi-RS                         NZP-CSI-RS-ResourceId
OPTIONAL, -- Cond NonCodebook
      slotOffset                       INTEGER (1..32)
OPTIONAL, -- Need S
      ...,
      [[
      aperiodicSRS-ResourceTriggerList           SEQUENCE
(SIZE(1..maxNrofSRS-TriggerStates-2))
                                        OF INTEGER (1..maxNrofSRS-
TriggerStates-1)    OPTIONAL -- Need M
      ]]
    },
    semi-persistent                  SEQUENCE {
      associatedCSI-RS                 NZP-CSI-RS-ResourceId
OPTIONAL, -- Cond NonCodebook
      ...
    },
    periodic                       SEQUENCE {
      associatedCSI-RS                 NZP-CSI-RS-ResourceId
OPTIONAL, -- Cond NonCodebook
      ...
    }
  },
  usage                          ENUMERATED {beamManagement, codebook,
nonCodebook, antennaSwitching},
  alpha                          Alpha
OPTIONAL, -- Need S
  p0                           INTEGER (-202..24)
OPTIONAL, -- Cond Setup
  pathlossReferenceRS                  PathlossReferenceRS-Config
OPTIONAL, -- Need M
  srs-PowerControl AdjustmentStates           ENUMERATED { sameAsFci2,
separateClosedLoop}                OPTIONAL, -- Need S
```

When the SRS resource set is configured as 'aperiodic', the SRS resource set also includes configuration of trigger state(s) (aperiodicSRS-Resource Trigger, aperiodicSRS-Resource TriggerList). The triggering state(s) defines which downlink control information (DCI) codepoint(s) triggers the corresponding SRS resource set transmission.

The aperiodic SRS may be triggered via an SRS Request field in the DCI. The SRS Request field may be carried by DCI format 0_1/0_2/1_1/1_2/2_3. Note that DCI format 0_1/0_2 is used for scheduling the physical uplink shared channel (PUSCH), DCI format 1_1/1_2 is used for scheduling the physical downlink shared channel (PDSCH) and DCI format 2_3 is used to trigger aperiodic SRS for a group of UEs.

Figure 3:
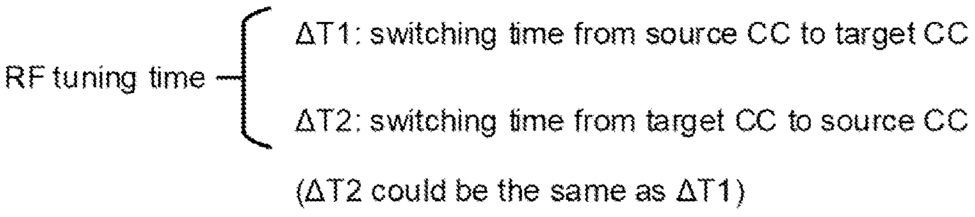
FIG. 3 illustrates SRS carrier switching collision handling in accordance with some aspects.
Figure 3:
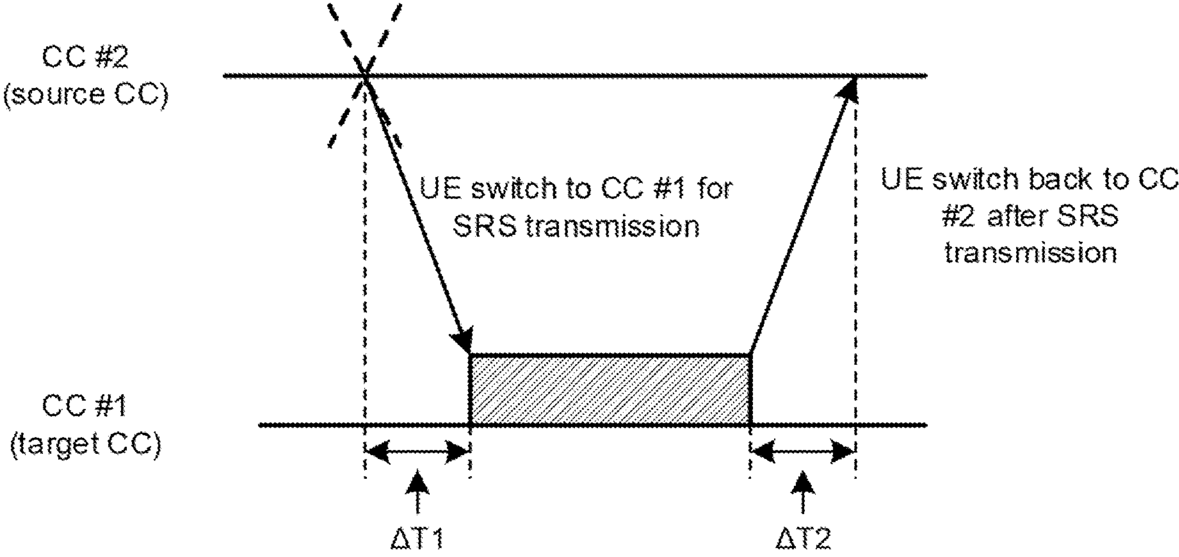

The SRS may be used for carrier switching to perform sounding over CCs without a PUSCH having been configured. For carrier switching, the SRS resource sets with usage set to 'antennaSwitching' are used. FIG. 3 illustrates SRS carrier switching collision handling in accordance with some aspects. In some cases, the UE may be unable to support simultaneous transmission over multiple CCs. In these cases, in the current 3GPP Rel-16 specification, a collision handling rule is defined for SRS carrier switching if there is collision between the UL signal over a source CC and the SRS transmission over a target CC.

For a carrier of a serving cell with a TDD slot format that includes both UL and DL symbols and is not configured for PUSCH/PUCCH transmission, the UE may not transmit an SRS on a carrier of the serving cell whenever an overlap in the same symbol occurs on the carrier of the serving cell between the SRS transmission and a PUSCH/PUCCH transmission carrying a HARQ-ACK/positive SR/RI/CRI/SSBRRI and/or PRACH that may result in UL transmissions beyond the UE's indicated UL carrier aggregation capability. The SRS transmission includes any interruption due to UL or DL retuning time as defined by higher layer parameters switching Time UL and switching TimeDL of SRS-Switching TimeNR.

In addition, for a carrier of a serving cell with a TDD slot format that includes both UL and DL symbols and is not configured for PUSCH/PUCCH transmission, the UE may drop a periodic/semi-persistent SRS whenever an overlap in the same symbol occurs on the carrier of the serving cell between the periodic/semi-persistent SRS transmission and a PUSCH transmission carrying an aperiodic SRS that may result in UL transmissions beyond the UE's indicated UL carrier aggregation capability. The SRS transmission includes any interruption due to UL or DL retuning time as defined by higher layer parameters switching Time UL and switching TimeDL of SRS-Switching TimeNR.

In addition, for a carrier of a serving cell with a TDD slot format that includes both UL and DL symbols and is not configured for PUSCH/PUCCH transmission, the UE may drop a PUSCH/PUCCH transmission carrying a periodic/semi-persistent CSI that contains only CQI/PMI/L1-RSRP/L1-SINR and/or an SRS transmission on another serving cell configured for PUSCH/PUCCH transmission whenever an overlap in the same symbol occurs on the carrier of the serving cell between the transmission and the SRS transmission that may result in UL transmissions beyond the UE's indicated UL carrier aggregation capability. The SRS transmission includes any interruption due to UL or DL retuning time as defined by higher layer parameters switching Time UL and switching TimeDL of SRS-Switching TimeNR.

In addition, for a carrier of a serving cell with a TDD slot format that includes both UL and DL symbols and is not configured for PUSCH/PUCCH transmission, the UE may drop a PUSCH transmission carrying an aperiodic CSI that contains only CQI/PMI/L1-RSRP/L1-SINR whenever an overlap in the same symbol occurs on the carrier of the serving cell between the transmission and an aperiodic SRS transmission that may result in UL transmissions beyond the UE's indicated UL carrier aggregation capability. The SRS transmission includes any interruption due to UL or DL retuning time as defined by higher layer parameters switching TimeUL and switching TimeDL of SRS-SwitchingTimeNR.

Figure 4:
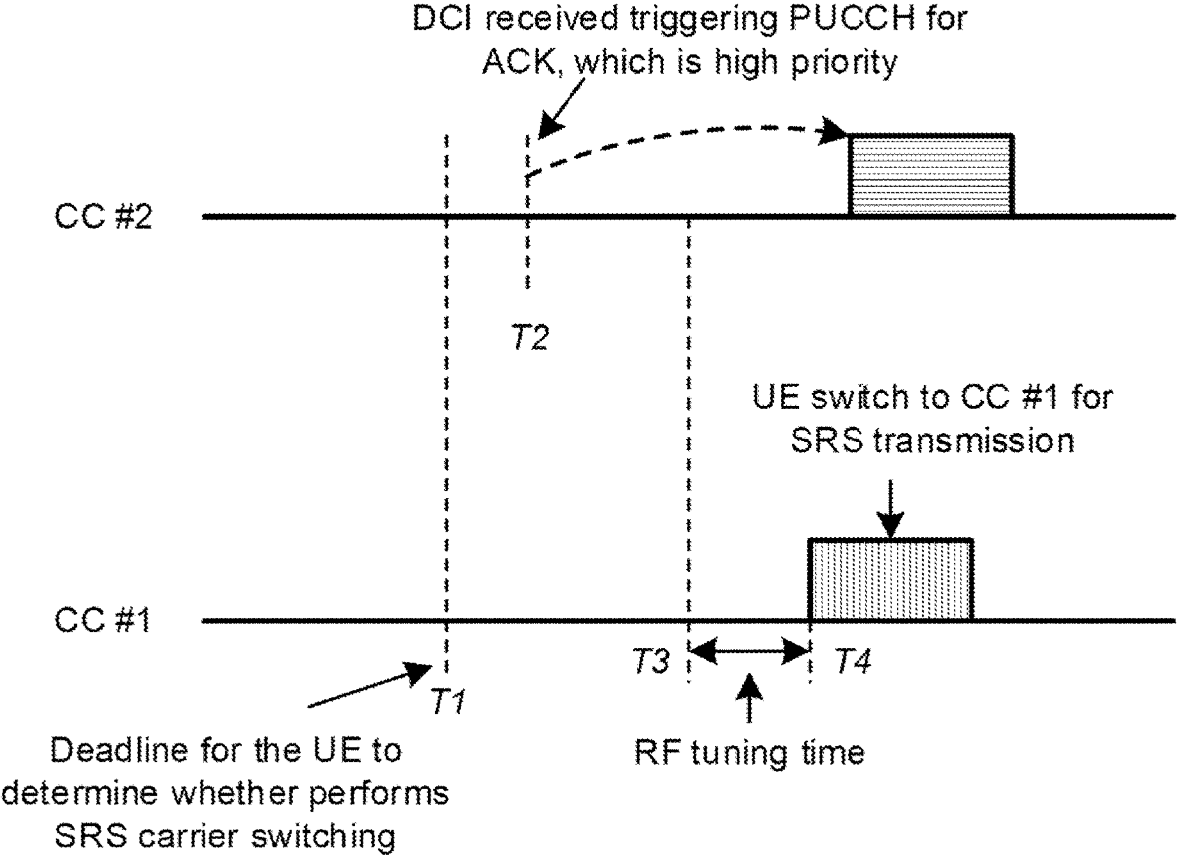
FIG. 4 illustrates an SRS carrier switching deadline in accordance with some aspects.

Moreover, the timeline processing for collision handling for SRS carrier switching is defined in the 3GPP specification. This is to say that a DCI received after predetermined deadline will not be considered for collision handling. FIG. 4 illustrates an SRS carrier switching deadline in accordance with some aspects. As shown FIG. 4, T1 is the deadline to determine whether SRS carrier switching should be performed according to the collision handling rules. At T2, a DCI is received triggering a PUCCH for an ACK over source CC. Although the PUCCH is high priority, the PUCCH is not considered for collision handling since the DCI is received after the deadline for the SRS switching determination. Therefore, the UE will switch to the target CC for SRS transmission. However, in current 3GPP specification, it is unclear whether multiple SRS resource sets for carrier switching are triggered by the same DCI. For example, for the time period between the aperiodic SRS resource sets, it is unclear whether the UE should switch back to the source CC or stay in the target CC; the timeline processing when multiple SRS resource sets are triggered by the same DCI is also unclear.

SRS Carrier Switching with multiple aperiodic SRS resource sets triggered by single DCI In an embodiment, for multiple aperiodic SRS resource sets for SRS carrier switching triggered by the same DCI, the transmit carrier of the UE may stay in the target CC during the time period between the aperiodic SRS resource sets irrespective of the length of the time period between aperiodic SRS resource sets.

Figure 5:
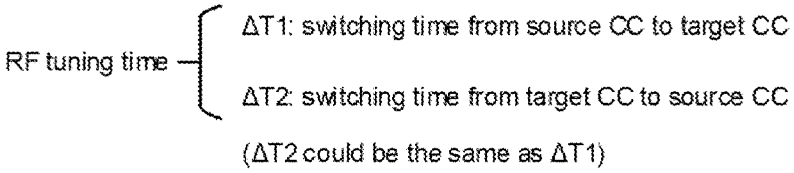
FIG. 5 illustrates SRS carrier switching operation in accordance with some aspects.
Figure 5:
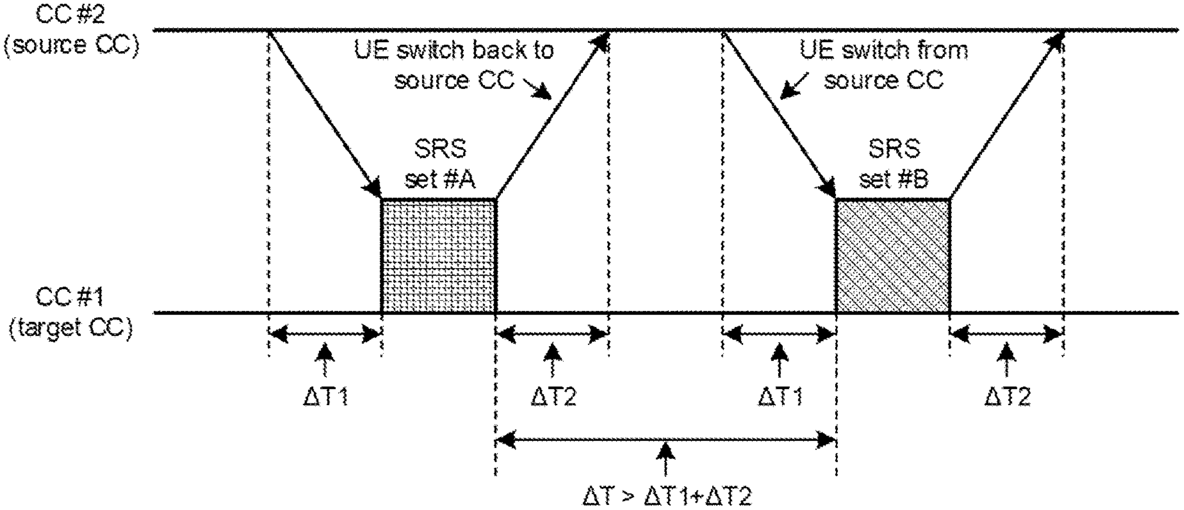

In another embodiment, for multiple aperiodic SRS resource sets for SRS carrier switching triggered by the same DCI, the UE may switch back to a transmit carrier in the source CC during the time period between the aperiodic SRS resource sets, if the time period between the aperiodic SRS resource sets is larger than the RF switching time. FIG. 5 illustrates SRS carrier switching operation in accordance with some aspects. In particular, FIG. 5 shows an example of the operation with the time period (ΔT) between the aperiodic SRS resource sets is larger than the RF tuning time (ΔT1+ΔT2). In this case, the UE switches the transmit carrier back to the source CC after transmitting the first SRS resource set.

Figure 6:
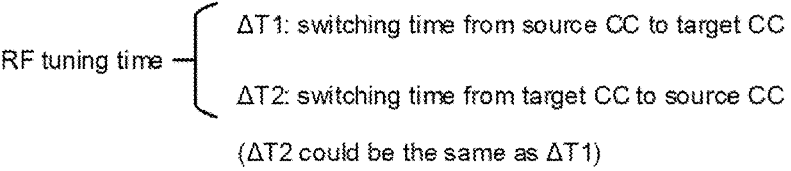
FIG. 6 illustrates another SRS carrier switching operation in accordance with some aspects.
Figure 6:
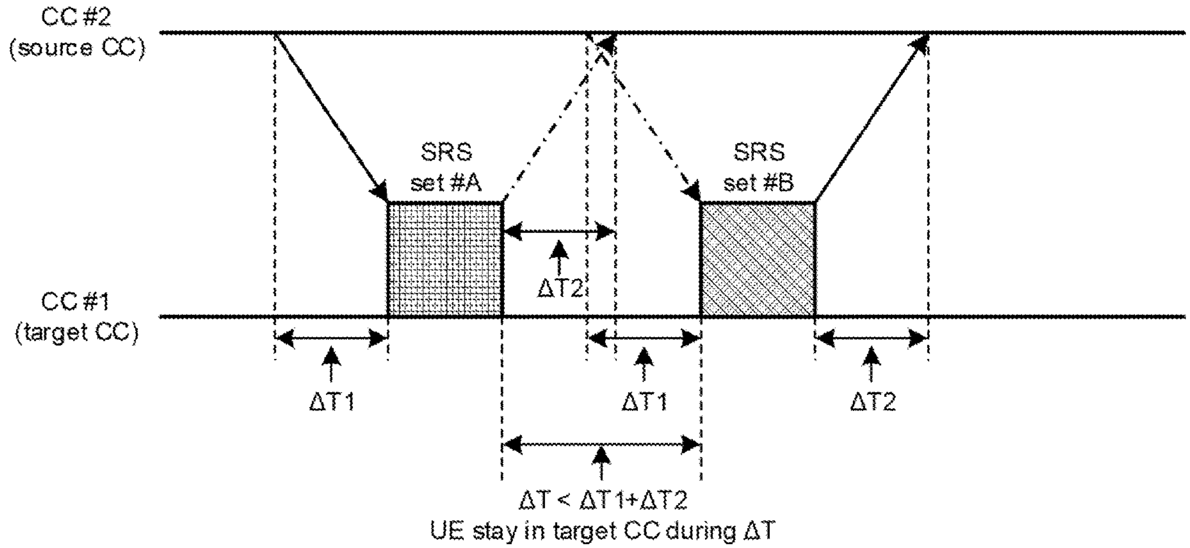

If the time period between the aperiodic SRS resource sets is smaller than (or equal to) the RF switching time, then the transmit carrier may remain in the target CC for SRS transmission. FIG. 6 illustrates another SRS carrier switching operation in accordance with some aspects. In particular, FIG. 6 shows an example of the operation with the time period (ΔT) between the aperiodic SRS resource sets is smaller than the RF tuning time (ΔT1+ΔT2). In this case, the UE transmit carrier may remain in the target CC during the period between aperiodic SRS resource sets.

Figure 7:
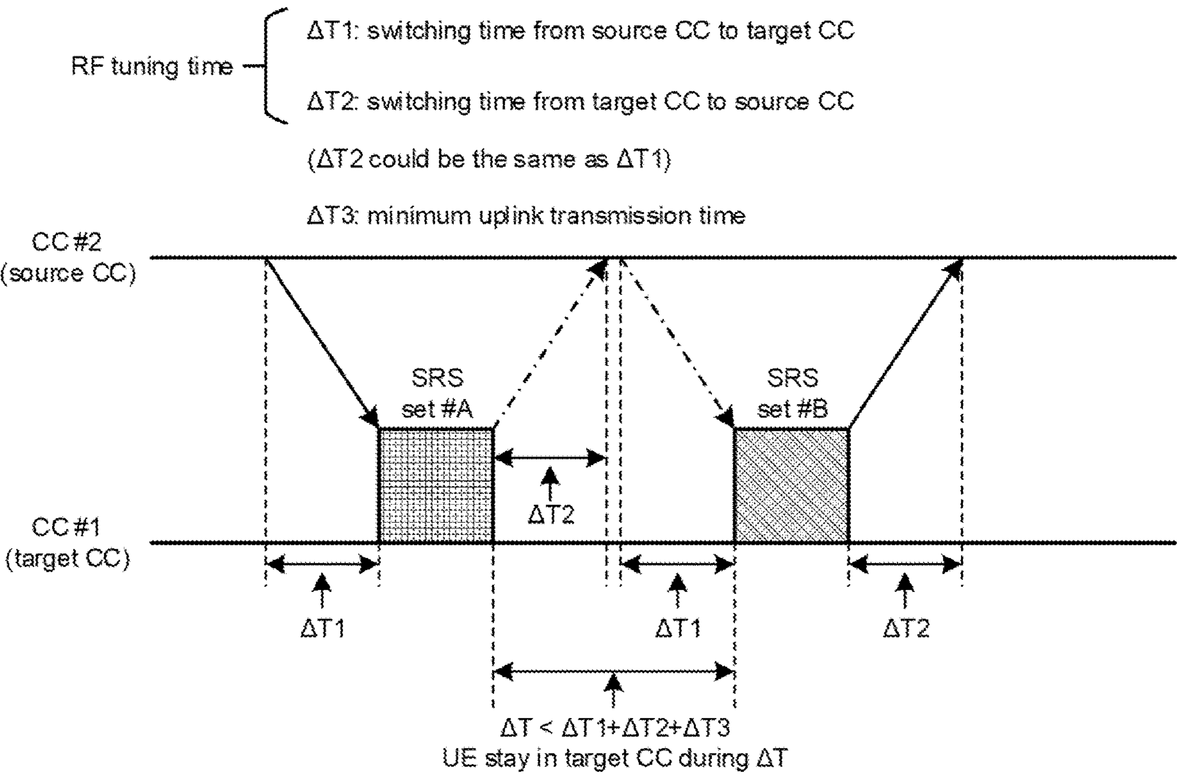
FIG. 7 illustrates another SRS carrier switching operation in accordance with some aspects.

In another example, if the time period between the aperiodic SRS resource sets is smaller than the RF tuning time plus a minimum transmission time, then the UE transmit carrier may stay in the target CC during the period between aperiodic SRS resource sets. FIG. 7 illustrates another SRS carrier switching operation in accordance with some aspects. In particular, FIG. 7 shows an example of the operation in which the time period (ΔT) between the aperiodic SRS resource sets is smaller than the RF tuning time plus the minimum transmission time (ΔT1+ΔT2+ΔT3). In this case, the UE transmit carrier may remain in the target CC during the period between aperiodic SRS resource sets.

Figure 8:
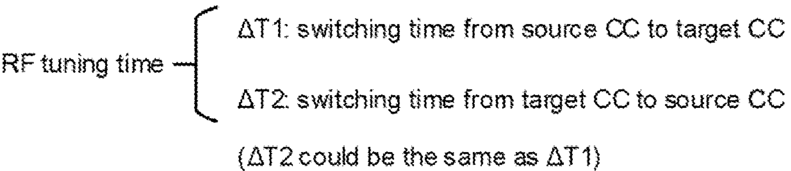
FIG. 8 illustrates another SRS carrier switching operation in accordance with some aspects.
Figure 8:
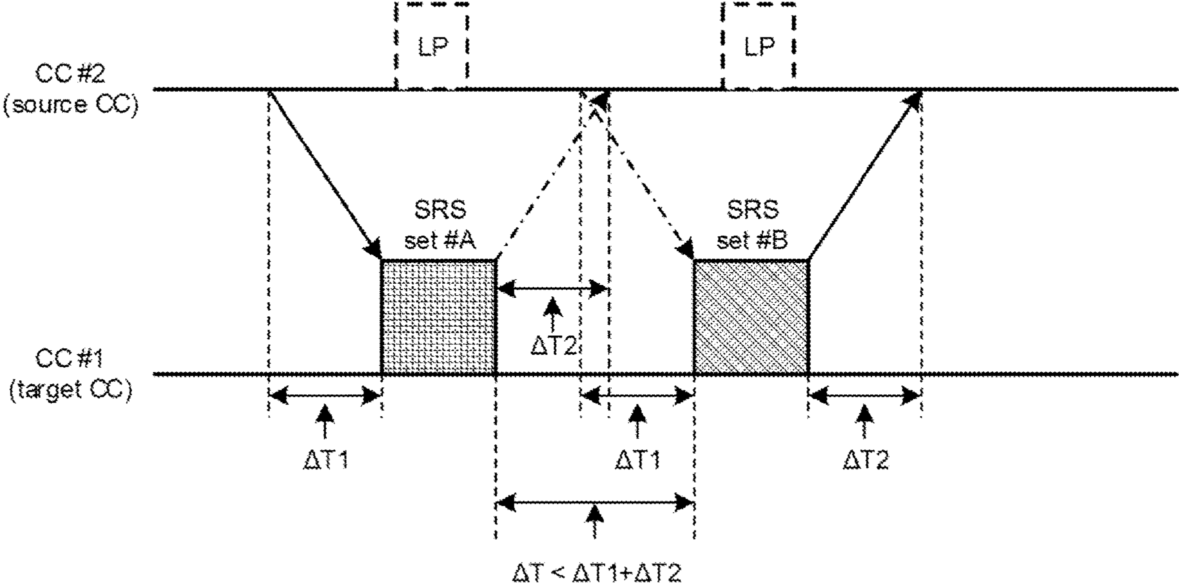

In another embodiment, for multiple aperiodic SRS resource sets for carrier switching triggered by the same DCI, if the time period between the aperiodic SRS resource sets is smaller than the RF tuning time, whether the UE should stay in the targeting CC during the period between aperiodic SRS resource sets depends on the collision handling. In one example, if all the multiple aperiodic SRS resource sets are high priority than other UL transmission over the source CC or there is no collision, then the UE carrier frequency may remain stay in the target CC during the time period between the aperiodic SRS resource sets. FIG. 8 illustrates another SRS carrier switching operation in accordance with some aspects. In particular, FIG. 8 shows an example of the operation in which the time period (ΔT) between the aperiodic SRS resource sets is smaller than the RF tuning time (ΔT1+ΔT2) but the aperiodic SRS resource sets are high priority. In this case, the UE transmit carrier may remain in the target CC during the period between aperiodic SRS resource sets.

Figure 9:
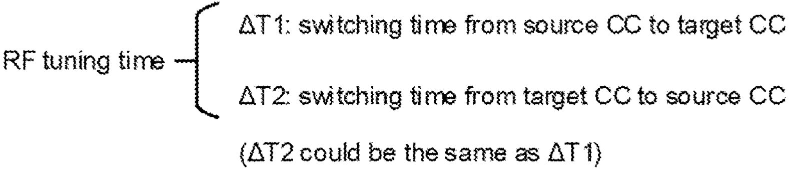
FIG. 9 illustrates another SRS carrier switching operation in accordance with some aspects.
Figure 9:
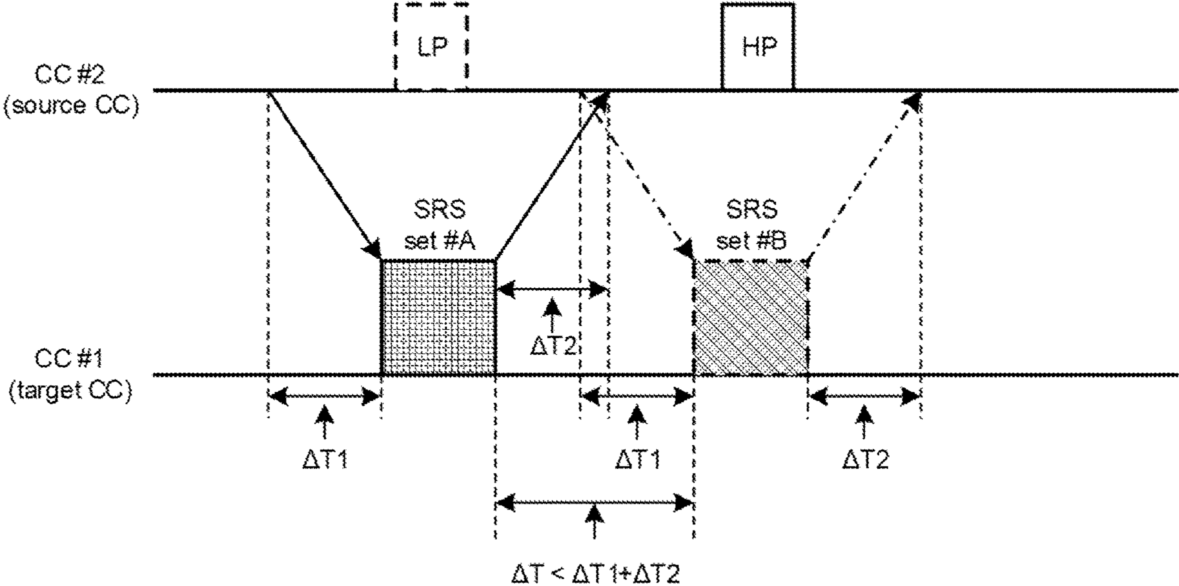

In another example, if the first SRS resource set is high priority and the second SRS resource set is low priority, the UE may switch back to the source CC after transmitting the first SRS resource set. FIG. 9 illustrates another SRS carrier switching operation in accordance with some aspects. As shown in FIG. 9, the UE retunes to CC #1 to transmit the high priority SRS set (SRS set #A) and, even though the time period (ΔT) between the SRS resource sets is smaller than the RF tuning time (ΔT1+ΔT2), the UE retunes to the source CC (CC #2) to transmit the high priority signal instead of the low priority SRS set (SRS set #B) because of the priority difference between the overlapping signals.

Figure 10:
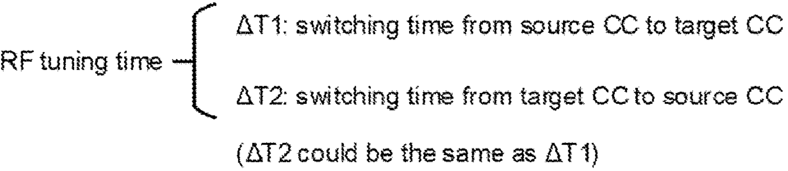
FIG. 10 illustrates another SRS carrier switching operation in accordance with some aspects.
Figure 10:
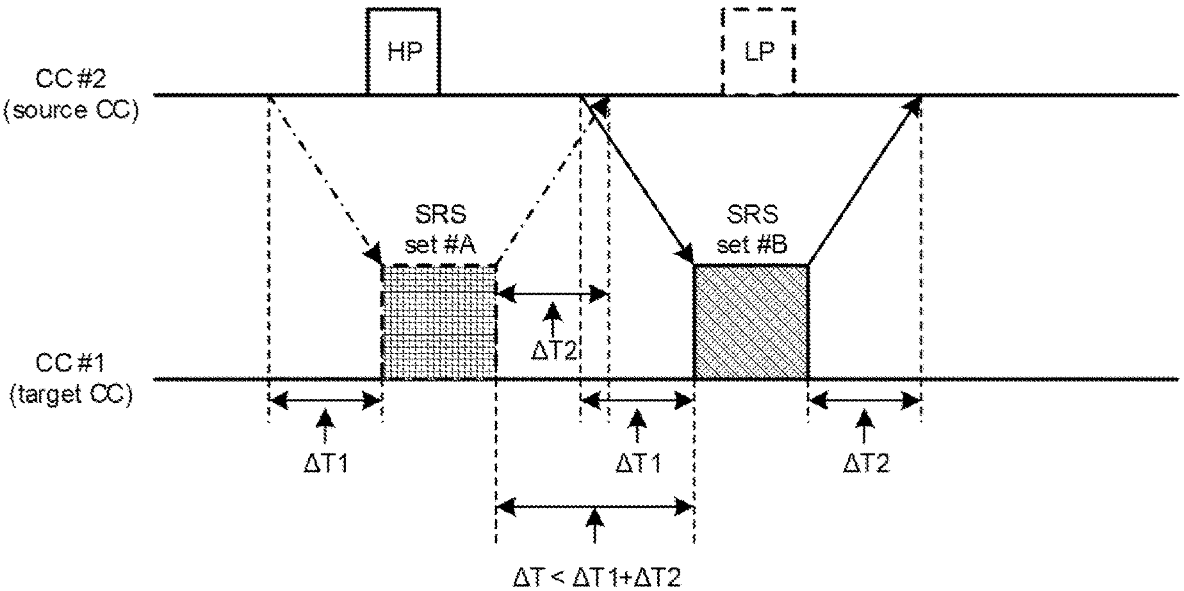

In another example, if the first SRS resource set is low priority and the second SRS resource set is high priority, the first SRS resource set may be dropped and the UE may switch to the targeting CC to transmit the second SRS resource set. FIG. 10 illustrates another SRS carrier switching operation in accordance with some aspects. As shown in FIG. 10, the UE remains on CC #2 to transmit the high priority signal and drops the low priority SRS set (SRS set #A) and retunes to the target CC (CC #1) to transmit the high priority SRS set (SRS set #B) because of the priority difference between the overlapping signals.

In another embodiment, for multiple aperiodic SRS resource sets for carrier switching triggered by the same DCI, collision handling may be performed independently for each SRS resource set. In this case, SRS resource set(s) (including RF switching time) colliding with a high priority UL transmission over the source CC may be dropped by the UE; SRS resource set(s) (including RF switching time) without colliding or colliding with low priority UL transmission over the source CC may be transmitted by the UE.

Figure 11:
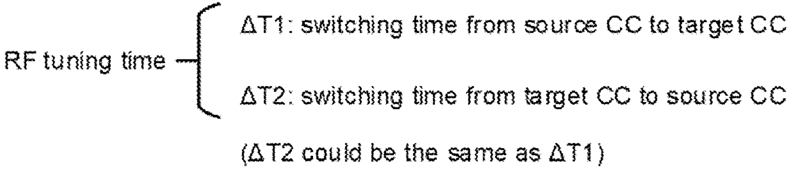
FIG. 11 illustrates another SRS carrier switching operation in accordance with some aspects.
Figure 11:
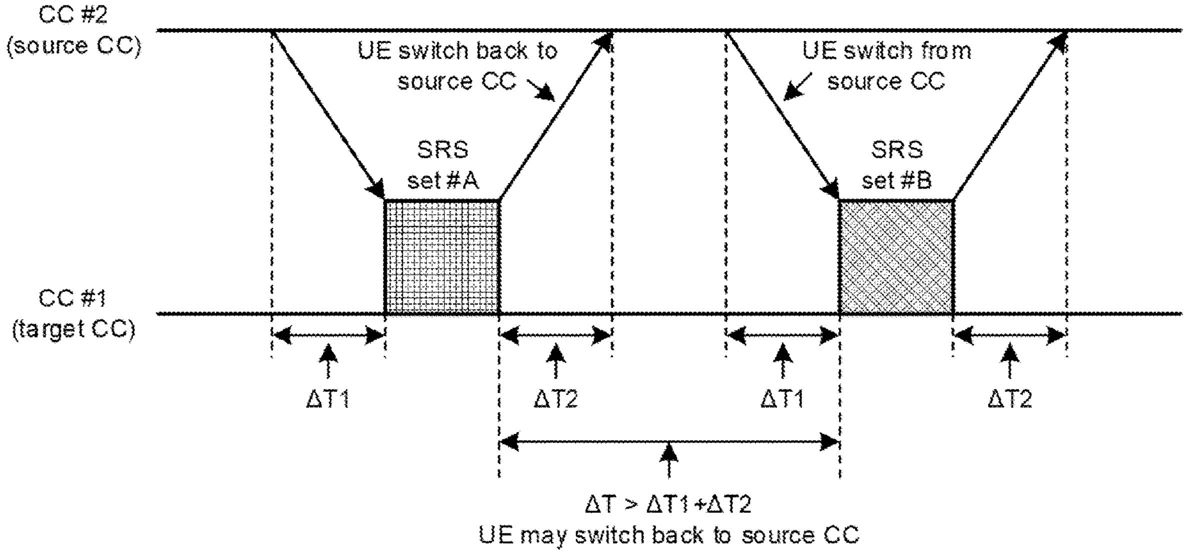

In another embodiment, for SRS carrier switching, the UE behavior during the period between two SRS resources may be applied to the case of periodic SRS, semi-persistent SRS, and aperiodic SRS. Considering the time period between two SRS resources for carrier switching: both SRS resources may be periodic, semi-persistent, or aperiodic; one SRS resource may be aperiodic and the other periodic; one SRS resource may be aperiodic and the other semi-persistent; or one SRS resource may be periodic and the other semi-persistent. In some embodiments, if the time period between the two SRS resources is larger than or equal to a predetermined threshold (for example, the RF tuning time), then the UE may switch back to the source CC after sending the first SRS resource. FIG. 11 illustrates another SRS carrier switching operation in accordance with some aspects. FIG. 11 shows the UE switching to the target CC to transmit the first SRS resource (a periodic SRS resource), then back to the source CC after sending the first SRS resource due to the time period between the two SRS resources being larger than the RF tuning time, before returning to the target CC to transmit the second SRS resource (an aperiodic SRS resource).

Figure 12:
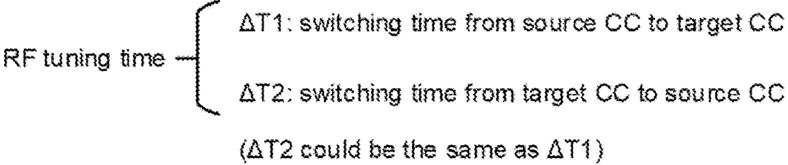
FIG. 12 illustrates another SRS carrier switching operation in accordance with some aspects.
Figure 12:
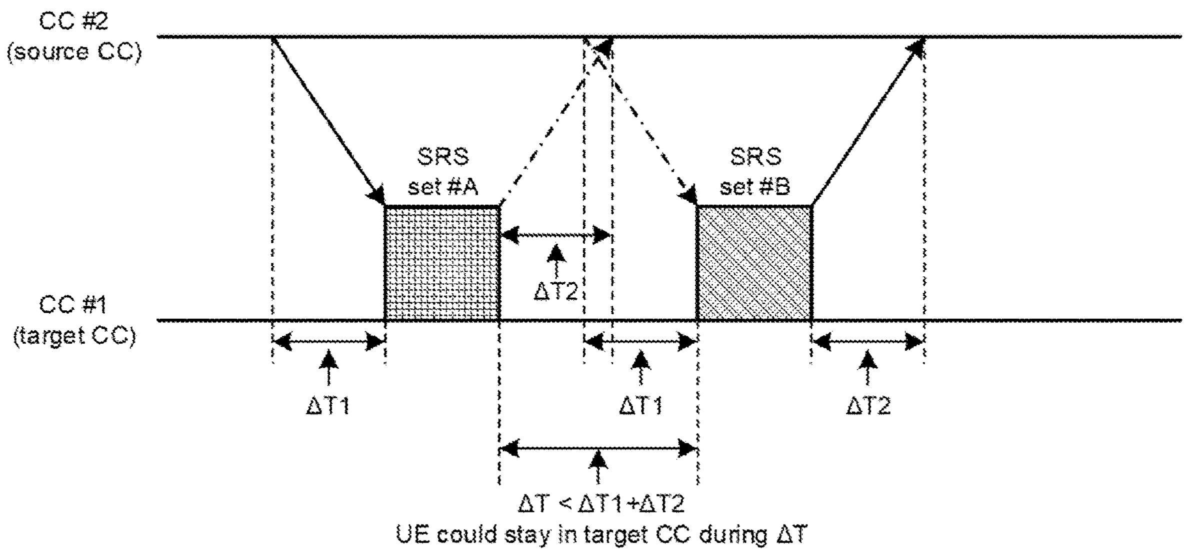

In some embodiments, if the time period between the two SRS resources is smaller than or equal to the predetermined threshold, then the UE may remain in the target CC after sending the first SRS resource. FIG. 12 illustrates another SRS carrier switching operation in accordance with some aspects. FIG. 12 shows the UE switching to the target CC to transmit the first SRS resource (a periodic SRS resource), and remaining on the target CC after sending the first SRS resource to transmit the second SRS resource (an aperiodic SRS resource) due to the time period between the two SRS resources being smaller than the RF tuning time.

In another example, the UE may always switch back to the source CC after sending the first SRS resource, irrespective of the length of the time period between the two SRS resources. If the time is insufficient for the UE to switch to the target CC to transmit the second SRS resource, then the second SRS resource may be dropped (or the UE will drop only the part of the SRS symbols that the UE is unable to transmit due to the timing).

In another example, the UE may always remain in the target CC between the two SRS resources, irrespective of the length of the time period between the two SRS resources.

In another embodiment, for SRS carrier switching, the UE behavior could be defined at the SRS resource level. The UE behavior during the period between two SRS resources may be applied to the case of periodic SRS, semi-persistent SRS, and aperiodic SRS transmissions.

As above, considering the time period between two SRS resource sets for carrier switching: both SRS resource sets may be periodic, semi-persistent, or aperiodic; one SRS resource set may be aperiodic and the other periodic; one SRS resource set may be aperiodic and the other semi-persistent; or one SRS resource set may be periodic and the other semi-persistent.

In some embodiments, if the time period between the two SRS resources is larger than or equal to the predetermined threshold (for example, the RF tuning time), then the UE may switch back to source CC after sending the first SRS resource. In some embodiments, if the time period between the two SRS resources is smaller than or equal to the predetermined threshold, then the UE may remain in the target CC after sending the first SRS resource.

In another example, the UE may always switch back to the source CC after sending the first SRS resource, irrespective of the length of the time period between the two SRS resources. If the time is insufficient for the UE to switch to the target CC to transmit the second SRS resource, then the second SRS resource may be dropped.

In another example, the UE may always stay in the target CC between the two SRS resources, irrespective of the length of the time period between the two SRS resources.

Figure 13:
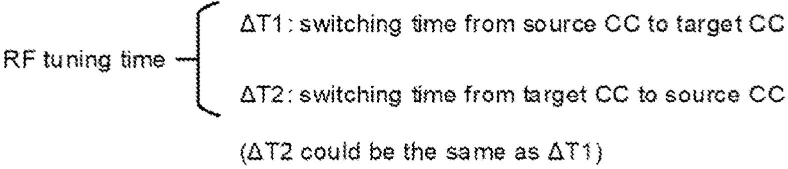
FIG. 13 illustrates another SRS carrier switching operation in accordance with some aspects.
Figure 13:
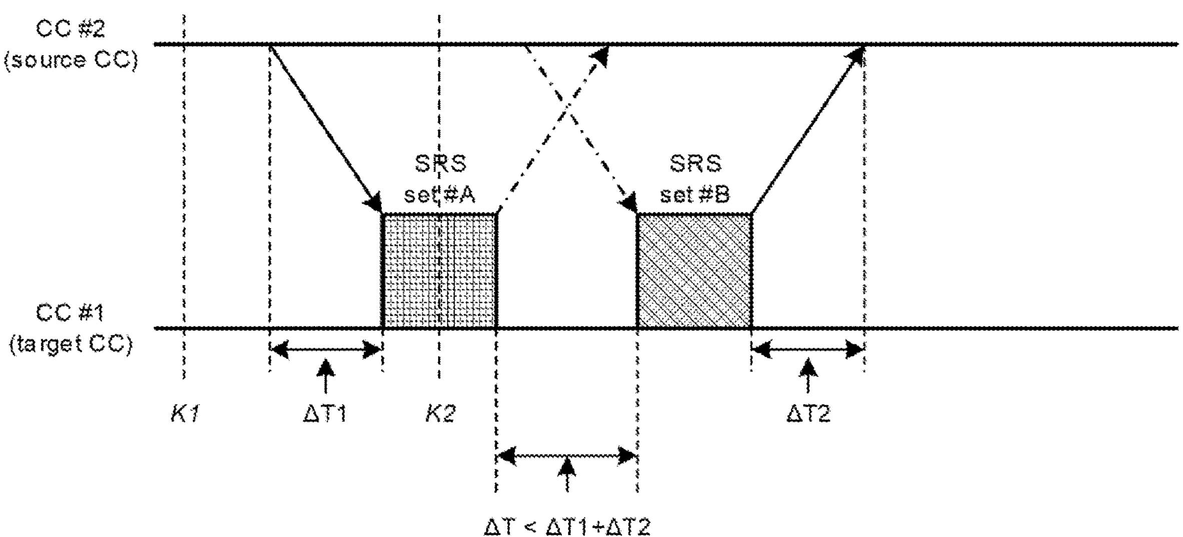

In another embodiment, for multiple aperiodic SRS resource sets for carrier switching triggered by the same DCI, the timeline processing (i.e., the deadline to consider the DCI for collision handling) may be performed independently for each SRS resource set, no matter whether the time period between aperiodic SRS resource sets is smaller than or larger than the RF tuning time. FIG. 13 illustrates another SRS carrier switching operation in accordance with some aspects. As shown in FIG. 13, K1 is the deadline to consider the DCI for collision handling for SRS resource set #A; K2 is the deadline to consider the DCI for collision handling for SRS resource set #B. K1 and K2 may be independent of each other.

In another embodiment, for multiple aperiodic SRS resource sets for carrier switching triggered by the same DCI, if the first SRS resource set is transmitted over the target CC, even though the second SRS set should be dropped, the second SRS set may be transmitted if the time is insufficient to switch back to the source CC to transmit the high priority signal.

Figure 14:
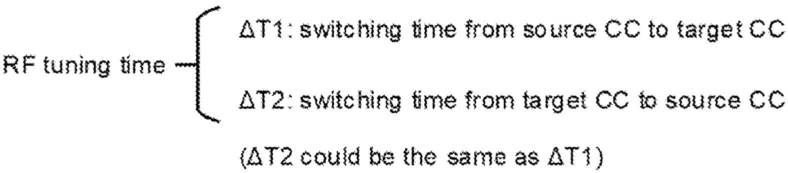
FIG. 14 illustrates another SRS carrier switching operation in accordance with some aspects.
Figure 14:
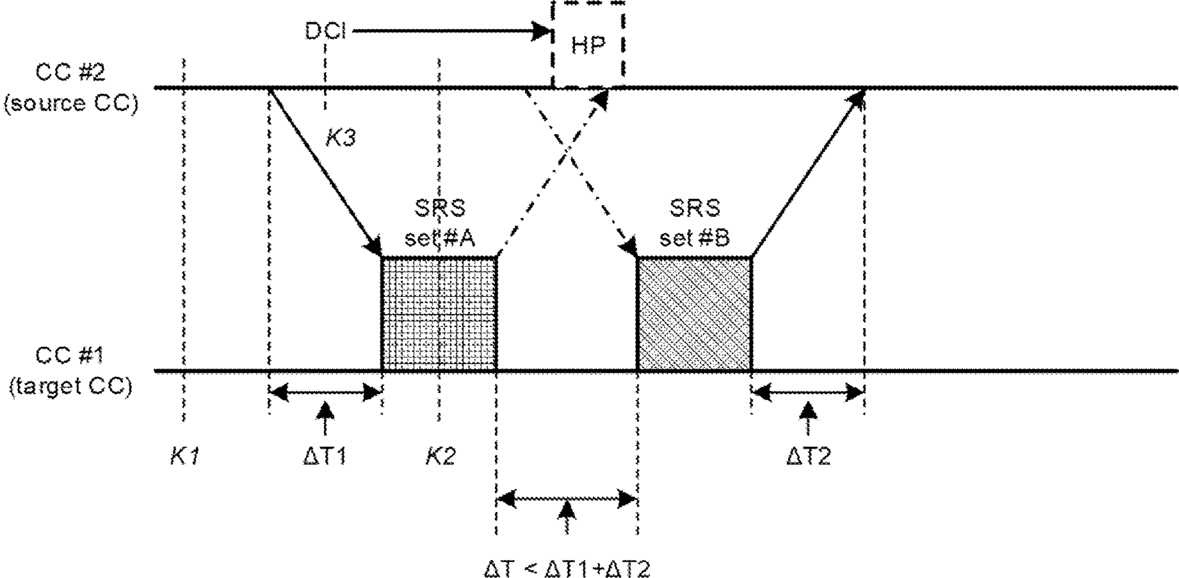

FIG. 14 illustrates another SRS carrier switching operation in accordance with some aspects. As shown in FIG. 14, the time instance K1 is deadline to make decision whether SRS set #A should be transmitted according to collision handling. The time instance K2 is deadline to make decision whether SRS set #B should be transmitted according to collision handling. At time instance K3, a DCI scheduling a high priority transmission over the source CC is received. At K1, when making a decision whether SRS set #A should be sent, the DCI received at K3 is not considered since the DCI is received after the deadline. Thus, SRS resource set #A is transmitted. At K2, when making a decision whether SRS set #B should be sent, the DCI received at K3 is considered since the DCI is received before the deadline of K3. According to the collision handling, SRS set #B should be dropped. However, since SRS set #A is already sent over target CC, the time is insufficient for the UE to switch back to the source CC to transmit the high priority uplink signal. Therefore, the UE may remain on the target CC and send SRS set #B. The high priority signal over the source CC is consequently dropped.

Figure 15:
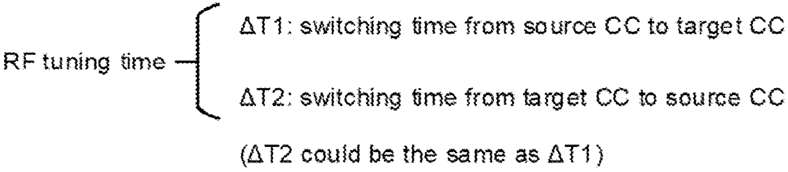
FIG. 15 illustrates another SRS carrier switching operation in accordance with some aspects.
Figure 15:
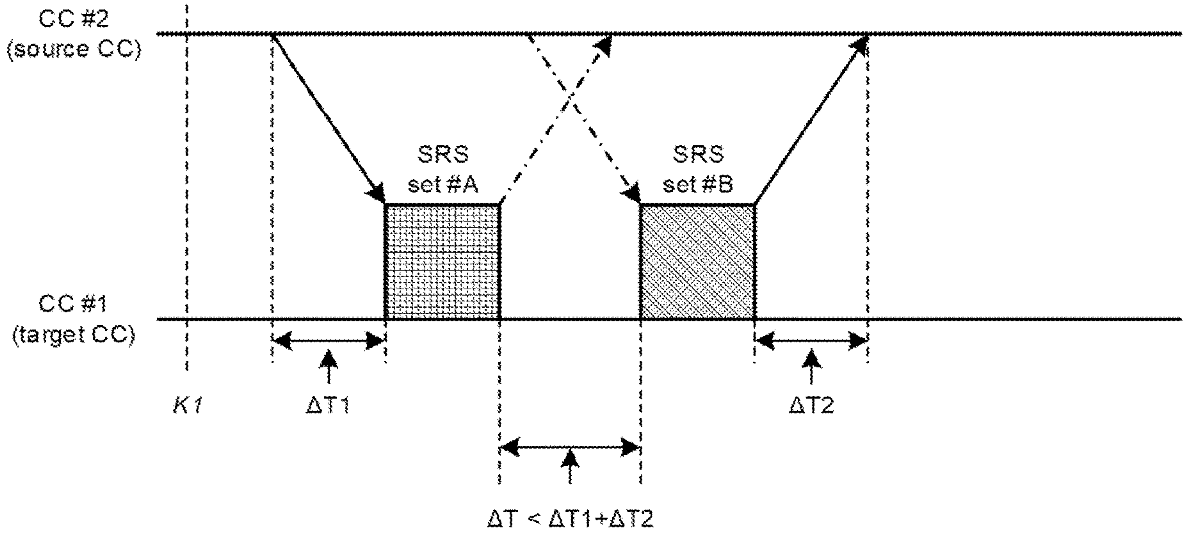

In another embodiment, for multiple aperiodic SRS resource sets for carrier switching triggered by the same DCI, the timeline processing (i.e., the deadline to consider the DCI for collision handling) should be performed for all the SRS resource sets triggered by the same DCI, no matter whether the time period between aperiodic SRS resource sets is smaller than or larger than the RF tuning time. That is, all the SRS resource sets triggered by the same DCI share the same deadline to consider the DCI for collision handling. FIG. 15 illustrates another SRS carrier switching operation in accordance with some aspects. As shown in FIG. 15, K1 is the deadline to consider the DCI for collision handling for both SRS resource set #A and SRS resource set #B. A DCI received after K1 scheduling a UL transmission over the source CC that may collide with SRS resource set #A and #B is not considered for the collision handling.

Timeline Operation for Periodic/Semi-Persistent SRS with Carrier Switching

In an embodiment, for an uplink component carrier CC1 that is not configured with a PUSCH/PUCCH, if a periodic/semi-persistent SRS configured with usage of antenna switching is transmitted, it may be desirable for the UE to suspend the uplink transmission over another carrier CC2 configured with PUSCH/PUCCH. In this case, a timeline may exist to handle the collision between the periodic/semi-persistent SRS over CC1 and the uplink transmission over another carrier CC2. That is, a deadline may be present to determine the periodic/semi-persistent SRS transmission. For example, the deadline may be N symbols prior to the periodic/semi-persistent SRS transmission, where N may be larger than or equal to the RF tuning time. A DCI received after the deadline may not be taken into account for collision handling for periodic/semi-persistent SRS transmissions.

Figure 16:
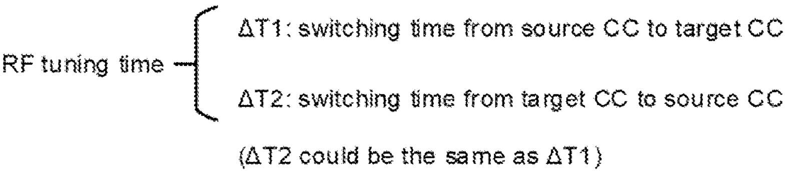
FIG. 16 illustrates another SRS carrier switching operation in accordance with some aspects.
Figure 16:
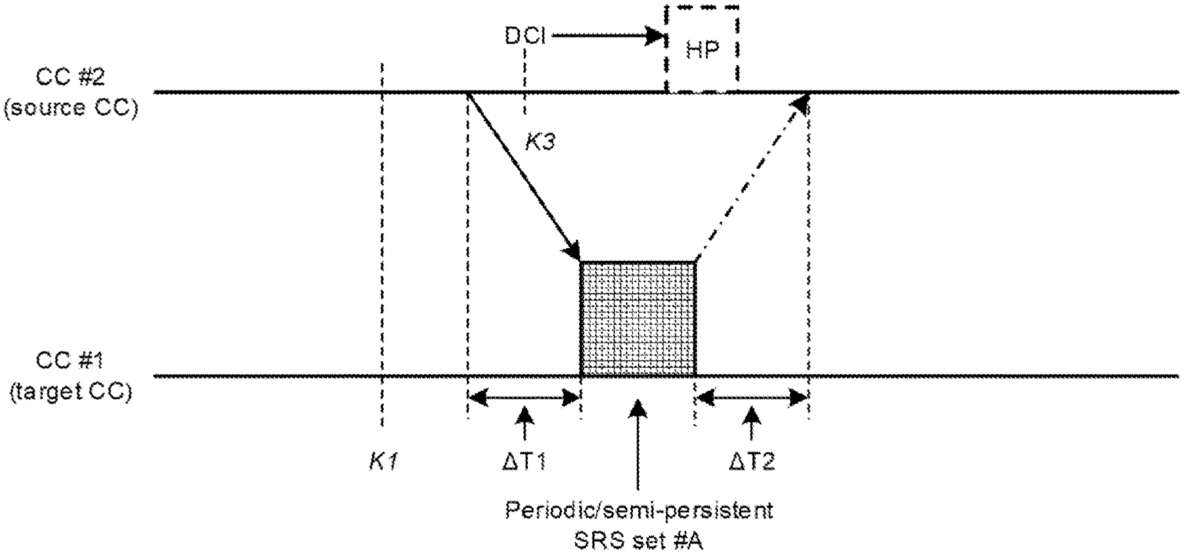

FIG. 16 illustrates another SRS carrier switching operation in accordance with some aspects. As shown, time instance K1 is the deadline to determine the periodic/semi-persistent SRS transmission for carrier switching. At time instance K3, a DCI is received that schedules a high priority transmission over the source CC. Since the DCI is received after the deadline, the high priority transmission over source CC is not considered for collision handling. The UE may instead transmit the periodic/semi-persistent SRS and drop the high priority transmission over the source CC.

Note that all of the above embodiments may be applied to the case of intra-SRS resource set handling. In this case, there are multiple gap symbols between SRS resources within the same SRS resource set.

Carrier Switching Configuration

In NR Rel-15/Rel-16, some UL carriers may not be configured with a PUSCH/PUCCH in the TDD system. In such case, SRS carrier switching may be used to derive the downlink precoder. The SRS is configured by the antennaSwitching information element (IE).

When the SRS is triggered, the UE may suspend the transmission over another uplink carrier to retune the RF if simultaneous transmission across multiple carriers exceeds the UE capability.

The IE SRS-CarrierSwitching is used to configure for SRS carrier switching when a PUSCH is not configured and is independent SRS power control from that of PUSCH.

SRS-CarrierSwitching information element

```
-- ASN1START
-- TAG-SRS-CARRIERSWITCHING-START
SRS-CarrierSwitching ::=                    SEQUENCE {
  srs-SwitchFromServCellIndex                 INTEGER (0..31)
OPTIONAL, -- Need M
  srs-SwitchFromCarrier                       ENUMERATED {sUL, nUL},
  srs-TPC-PDCCH-Group                         CHOICE {
    typeA                                 SEQUENCE (SIZE (1..32)) OF SRS-TPC-
PDCCH-Config,
    typeB                                 SRS-TPC-PDCCH-Config
  }
  monitoringCells                           SEQUENCE (SIZE (1..maxNrofServingCells))
OF ServCellIndex                    OPTIONAL, -- Need M
  ...
}
SRS-TPC-PDCCH-Config ::=                      SEQUENCE {
  srs-CC-SetIndexlist                       SEQUENCE (SIZE(1..4)) OF SRS-CC-
SetIndex                              OPTIONAL, -- Need M
}
SRS-CC-SetIndex ::=                         SEQUENCE {
  cc-SetIndex                             INTEGER (0..3)
OPTIONAL, -- Need M
  cc-IndexInOneCC-Set                         INTEGER (0..7)
OPTIONAL -- Need M
}
-- TAG-SRS-CARRIERSWITCHING-STOP
-- ASN1STOP
```

Figure 17:
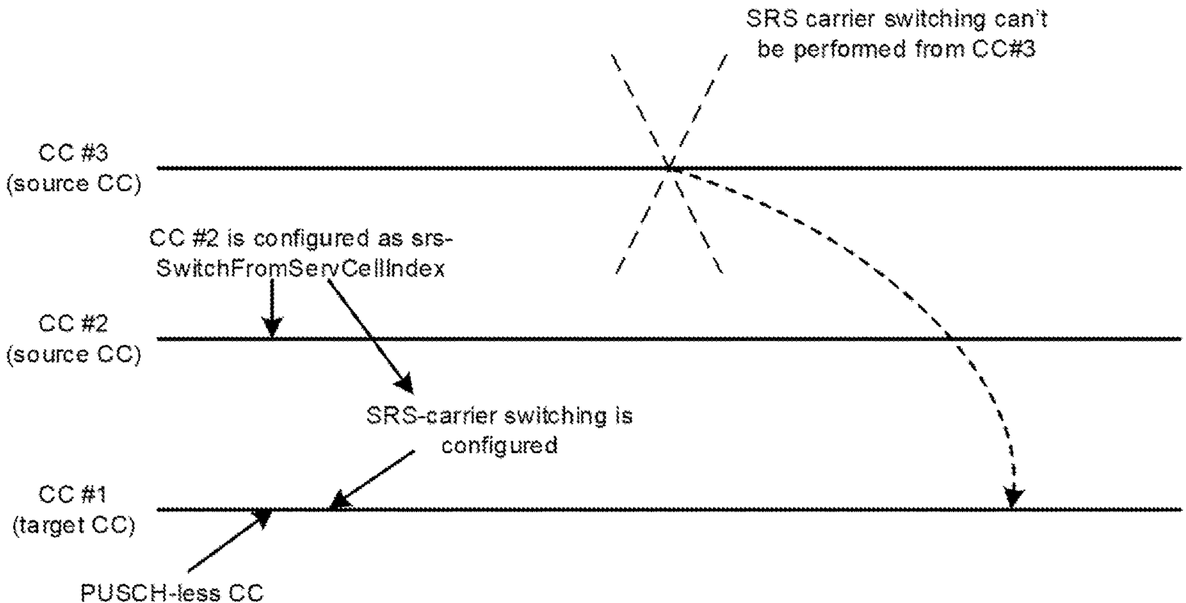
FIG. 17 illustrates SRS carrier switching operation restriction in accordance with some aspects.

The parameter srs-SwitchFromServCellIndex indicates a serving cell whose UL transmission may be interrupted during SRS transmission on a PUSCH-less SCell. It may be observed that only one value may be configured for srs-SwitchFromServCellIndex, i.e., only one source CC may be configured. This restricts the SRS switching operation. FIG. 17 illustrates SRS carrier switching operation restriction in accordance with some aspects. As shown in FIG. 17, if Source CC #2 is configured as srs-SwitchFromServCellIndex, then antenna switching from CC #3 is not possible.

The parameter monitoringCells defines a set of serving cells for monitoring a PDCCH conveying DCI format 2_3, which may trigger an SRS transmission for carrier switching. The DCI format 2_3 may also be used to trigger an SRS transmission that is configured with separate power control state as a PUSCH.

Figure 18:
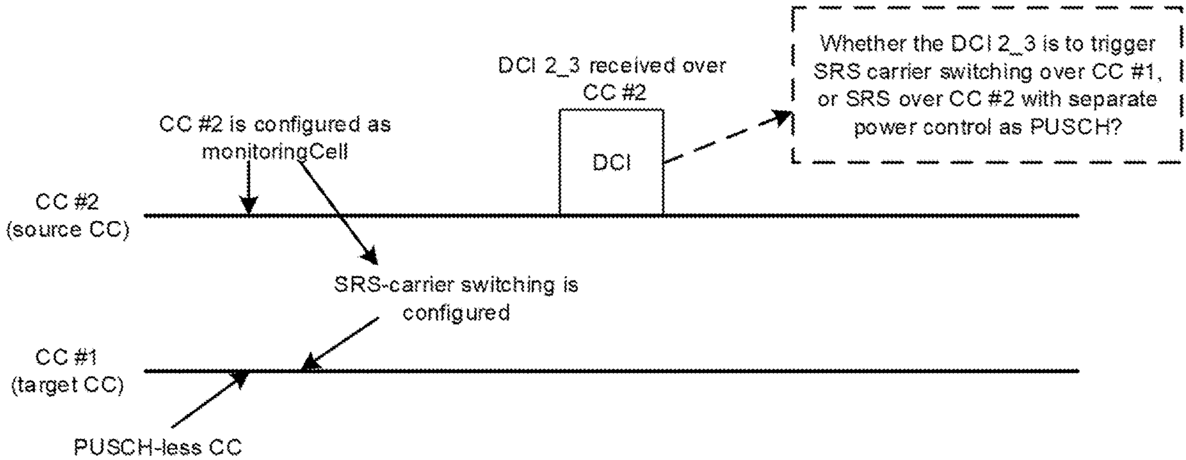
FIG. 18 illustrates a downlink control information (DCI) format 2_3 transmission in accordance with some aspects.

However, if one CC (CC #2) is configured as monitoringCells for SRS carrier switching, then there is no differentiation for the DCI format 2_3 over this CC, whether the DCI format 2_3 is used to trigger SRS carrier switching over another CC (CC #1) or is used for an SRS transmission with a separate power control state in the CC (CC #2). FIG. 18 illustrates a DCI format 2_3 transmission in accordance with some aspects.

SRS Carrier Switching Configuration

Figure 19:
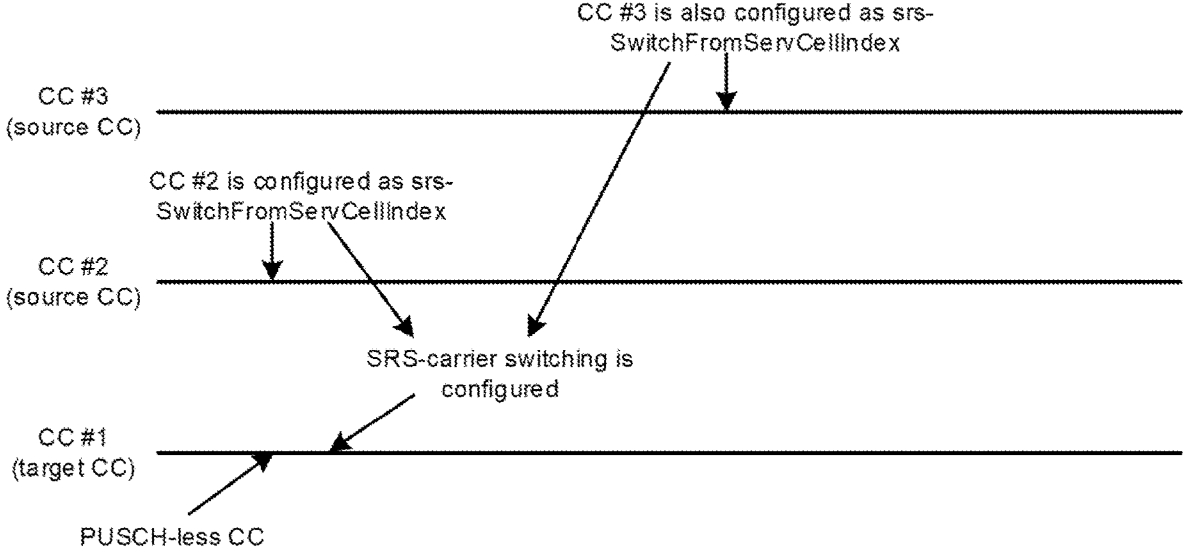
FIG. 19 illustrates multiple component carriers (CCs) configured as a source CC for SRS carrier switching in accordance with some aspects.

In an embodiment, for SRS carrier switching, the SRS switching from multiple source CCs may be supported. Multiple CCs may be configured as srs-SwitchFromServCellIndex. FIG. 19 illustrates multiple CCs configured as a source CC for SRS carrier switching in accordance with some aspects.

In an example, the RRC configuration for SRS-CarrierSwitching may be changed as below. A list may be added that contains one or multiple serving cell indexes (source CCs). The parameter maxNrofSwitchFromServCells indicates the maximum number of source CCs, and may be pre-defined or dependent on the UE capability.

SRS-CarrierSwitching information element

```
-- ASN1START
-- TAG-SRS-CARRIERSWITCHING-START
SRS-CarrierSwitching ::=                    SEQUENCE {
  srs-SwitchFromServCellIndex               INTEGER (0..31)
OPTIONAL, -- Need M
  srs-SwitchFromServCellIndexList
SEQUENCE(SIZE(1..maxNrofSwitchFromServCells) OF INTEGER (0..31)
OPTIONAL, -- Need M
  srs-SwitchFromCarrier                     ENUMERATED {SUL, nUL},
  srs-TPC-PDCCH-Group                       CHOICE {
    typeA                        SEQUENCE (SIZE (1..32)) OF SRS-TPC-
PDCCH-Config,
    typeB                        SRS-TPC-PDCCH-Config
  }
OPTIONAL, -- Need M
  monitoringCells                 SEQUENCE (SIZE (1..maxNrofServingCells))
OF ServCellIndex                 OPTIONAL, -- Need M
  ...
}
SRS-TPC-PDCCH-Config ::=                    SEQUENCE {
  srs-CC-SetIndexlist               SEQUENCE (SIZE(1..4)) OF SRS-CC-
SetIndex                         OPTIONAL -- Need M
}
SRS-CC-SetIndex ::=                         SEQUENCE {
  cc-SetIndex                    INTEGER (0..3)
OPTIONAL, -- Need M
  cc-IndexInOneCC-Set                       INTEGER (0..7)
OPTIONAL -- Need M
}
-- TAG-SRS-CARRIERSWITCHING-STOP
-- ASN1STOP
```

In an embodiment, the RRC configuration for SRS-CarrierSwitching may be applied for a PUSCH-less carrier or the SRS may be configured with a separate power control state as the PUSCH. An example of the change to RRC specification is shown as below:

SRS-CarrierSwitching

The IE SRS-CarrierSwitching is used to configure for SRS carrier switching when a PUSCH is not configured and or independent SRS power control from that of PUSCH.

| SRS-CarrierSwitching field descriptions |
| --- |
| monitoringCells<br>A set of serving cells for monitoring PDCCH conveying SRS DCI format with CRC scrambled by TPC-SRS-RNTI (see TS 38.212 [17], TS 38.213 [13], clause 7.3.1, 11.3). |
| srs-SwitchFromServCellIndex<br>Indicates the serving cell whose UL transmission may be interrupted during SRS transmission on a PUSCH-less SCell. During SRS transmission on a PUSCH-less SCell, the UE may temporarily suspend the UL transmission on a serving cell with PUSCH in the same CG to allow the PUSCH-less SCell to transmit SRS. (see TS 38.214 [19], clause 6.2.1.3). |
| srs-TPC-PDCCH-Group<br>Network configures the UE with either typeA-SRS-TPC-PDCCH-Group or typeB-SRS-TPC-PDCCH-Group, if any. |
| typeA<br>Type A trigger configuration for SRS transmission on a PUSCH-less SCell or for SRS transmission on uplink carrier(s) of a serving cell where the SRS is configured with a separate power control adjustment state from PUSCH (see TS 38.213 [13], clause 11.4). |

-continued

| SRS-CarrierSwitching field descriptions |
| --- |
| typeB<br>Type B trigger configuration for SRS transmission on a PUSCH-less SCell or for SRS transmission on uplink carrier(s) of a serving cell where the SRS is configured with a separate power control adjustment state from PUSCH (see TS 38.213 [13], clause 11.4). |

In another embodiment, DCI format 2_3 may be able to differentiate whether the DCI format 2_3 is used to trigger SRS carrier switching over a PUSCH-less carrier, or the DCI format 2_3 is used to trigger an SRS transmission over a carrier with a PUSCH and the SRS transmission is configured with a separate power control state as the PUSCH.

Figure 20:
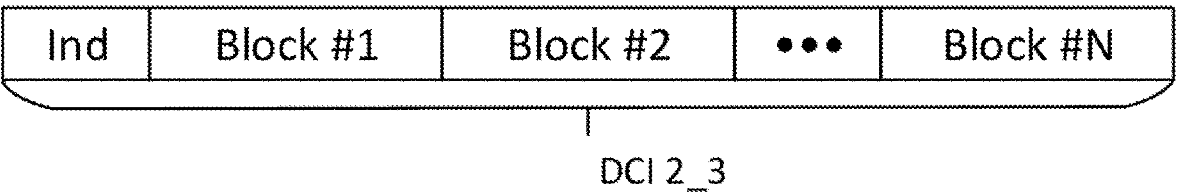
FIG. 20 illustrates a DCI format 2_3 transmission in accordance with some aspects.
Figure 21:
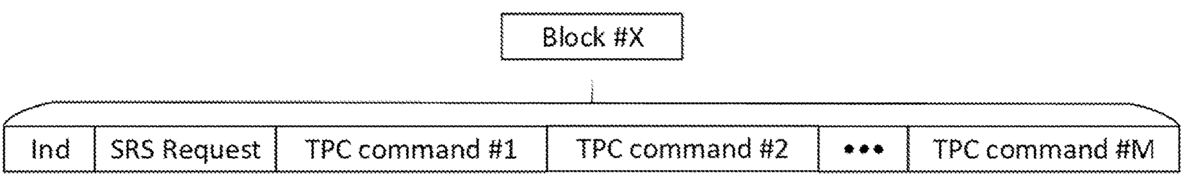
FIG. 21 illustrates another DCI format 2_3 transmission in accordance with some aspects.
Figure 21:
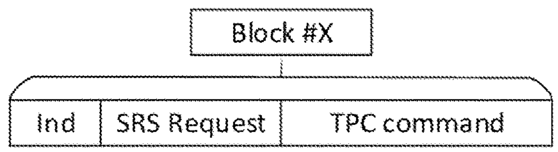

In one example, an indicator may be added to DCI format 2_3, indicating whether the DCI format 2_3 is used for SRS carrier switching over a PUSCH-less carrier, or is to trigger an SRS transmission with a separate power control state as the PUSCH. FIG. 20 illustrates a DCI format 2_3 transmission in accordance with some aspects. FIG. 21 illustrates another DCI format 2_3 transmission in accordance with some aspects. Specifically, in FIG. 20 only one new field (Ind) is added to DCI format 2_3 and may be applied to all the blocks in DCI format 2_3. In FIG. 21, the new field (Ind) is added to each block within DCI format 2_3.

In another embodiment, in order to avoid confusion for DCI format 2_3, one CC may not be configured as srs-SwitchFromServCellIndex and monitoringCells simultaneously, which is contained in the SRS-CarrierSwitching over another CC.

In another example, the monitoringCells may be configured the same as the CC over which the SRS-CarrierSwitching is configured. This may also be implicitly achieved by removing the monitoringCells parameter.

In another example, for a CC configured with a PUSCH, in order to trigger an SRS transmission with a separate power control state as the PUSCH via DCI format 2_3, the SRS-CarrierSwitching may be configured over this CC. In addition, the srs-SwitchFromServCellIndex and monitoringCells may be configured the same as the CC.

Accordingly, in the above embodiments, the gNB may configure the UE, using an RRC information element (IE), for SRS transmissions that include carrier switching. DCI format 2_3 may be used to trigger the SRS transmission. SRS switching from multiple source CCs may be configured using a srs-SwitchFromServCellIndex parameter in an SRS-CarrierSwitching IE. The RRC configuration for the SRS-CarrierSwitching IE, may be applied for a PUSCH-less carrier or the SRS transmission may be configured with a separate power control state as the PUSCH. DCI format 2_3 may be able to differentiate whether the DCI format 2_3 is used to trigger SRS carrier switching over a PUSCH-less carrier or is used to trigger an SRS transmission over a carrier with a PUSCH and the SRS transmission is configured with a separate power control state than the PUSCH. In some embodiments, an indicator may be added to DCI format 2_3, indicating whether DCI format 2_3 is used for SRS carrier switching over a PUSCH-less carrier or is to trigger an SRS transmission that has a separate power control state than the PUSCH. In this case, a new field of the indicator added to DCI format 2_3 may apply to all blocks, or may be applied individually to each block of DCI format 2_3. In some embodiments, the configuration of the UE may be limited such that the srs-SwitchFromServCellIndex and monitoringCells parameters, which are contained in the SRS-CarrierSwitching, do not simultaneously configured a single CC over another CC. This may avoid confusion within DCI format 2_3. The monitoringCells parameter may be configured the same as the CC over which the SRS-CarrierSwitching parameter is configured. Alternatively, the CC may be implicitly indicated by removing the monitoringCells parameter. For a CC configured with a PUSCH, the SRS-CarrierSwitching parameter may be configured over the CC to trigger an SRS transmission with a separate power control state from the PUSCH via DCI format 2_3. Additionally, the srs-SwitchFromServCellIndex and monitoringCells parameters may be configured the same as the CC.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a user equipment (UE) configured for operation in a fifth-generation new radio (5G NR) network, the apparatus comprising: processing circuitry; and memory, wherein the processing circuitry is configured to:

decode a downlink control information (DCI) format triggering aperiodic sounding reference signal (SRS) transmission;

when the UE is configured for SRS carrier switching and a serving cell is not configured for a physical uplink shared channel (PUSCH) transmission, the processing circuitry is to configure the UE for the aperiodic SRS transmission including:

transmitting an SRS resource set on a target component carrier (CC);

switching to a source CC; and switching back to the target CC, wherein the processing circuitry is configured to cause the UE to temporarily suspend an uplink transmission on the source CC during the transmission of the SRS resource set on the target CC, and wherein when the UE supports staying on the target CC for SRS switching, the processing circuitry is to configure the UE to:

stay on the target CC during a period between the SRS resource set transmissions if a time between the SRS resource set transmissions is smaller than an RF switching time for the UE to switch to the source CC and back to the target CC and a higher priority UL transmission and/or DL reception is not scheduled on the source CC in the period between the SRS resource set transmissions.

2. The apparatus of claim 1, wherein when the UE does not support staying on the target CC for SRS switching, the processing circuitry is to configure the UE to switch back to the source CC between the SRS resource set transmissions.

3. The apparatus of claim 2, wherein when the UE supports staying on the target CC for SRS switching, the processing circuitry is configured to encode signalling for transmission to a gNB indicating that the UE supports the staying on target CC for SRS switching as part of a carrier aggregation capability.

4. The apparatus of claim 3, wherein the processing circuitry is further configured to decode radio resource control (RRC) signalling received from the gNB to configure the UE for the SRS carrier switching.

5. The apparatus of claim 4, wherein the processing circuitry is further configured to suspend an uplink transmission on the source CC during an interruption due to RF retuning time when switching from the source CC to the target CC.

6. The apparatus of claim 5 wherein the processing circuitry is configured to apply dropping rules and/or timelines to target-source CC pairs for SRS carrier switching.

7. The apparatus of claim 5, wherein for the aperiodic SRS transmissions, the processing circuitry is to configure the UE to commence transmission of the SRS resource set based on timing of the DCI.

8. An apparatus for a user equipment (UE) configured for operation in a fifth-generation new radio (5G NR) network, the apparatus comprising: processing circuitry; and memory, wherein the processing circuitry is configured to:

decode a downlink control information (DCI) format triggering aperiodic sounding reference signal (SRS) transmission;

when the UE is configured for SRS carrier switching and a serving cell is not configured for a physical uplink shared channel (PUSCH) transmission, the processing circuitry is to configure the UE for the aperiodic SRS transmission including:

transmitting an SRS resource set on a target component carrier (CC);

switching to a source CC; and switching back to the target CC, wherein the processing circuitry is configured to cause the UE to temporarily suspend an uplink transmission on the source CC during the transmission of the SRS resource set on the target CC, and wherein when the UE supports staying on the target CC for SRS switching, the processing circuitry is to configure the UE to:

switch back to the source CC between the SRS resource set transmissions when a higher priority UL transmission and/or DL reception is scheduled on the source CC in a period between the SRS resource set transmissions.

9. An apparatus for a user equipment (UE) configured for operation in a fifth-generation new radio (5G NR) network, the apparatus comprising: processing circuitry; and memory, wherein the processing circuitry is configured to:

decode a downlink control information (DCI) format triggering aperiodic sounding reference signal (SRS) transmission;

when the UE is configured for SRS carrier switching and a serving cell is not configured for a physical uplink shared channel (PUSCH) transmission, the processing circuitry is to configure the UE for the aperiodic SRS transmission including:

transmitting an SRS resource set on a target component carrier (CC);

switching to a source CC; and switching back to the target CC, wherein the processing circuitry is configured to cause the UE to temporarily suspend an uplink transmission on the source CC during the transmission of the SRS resource set on the target CC, and wherein when the UE supports staying on the target CC for SRS switching, the processing circuitry is to configure the UE to:

switch back to the source CC between the SRS resource set transmissions when a time between the SRS resource set transmissions is not smaller than an RF switching time for the UE to switch to the source CC and back to the target CC.

10. A non-transitory computer-readable storage medium that stores instructions for execution by processing circuitry of a user equipment (UE) configured for operation in a fifth-generation new radio (5G NR) network, wherein the processing circuitry is configured to: decode a downlink control information (DCI) format triggering aperiodic sounding reference signal (SRS) transmission;

when the UE is configured for SRS carrier switching and a serving cell is not configured for a physical uplink shared channel (PUSCH) transmission, the processing circuitry is to configure the UE for the aperiodic SRS transmission including:

transmitting an SRS resource set on a target component carrier (CC);

switching to a source CC; and switching back to the target CC, wherein the processing circuitry is configured to cause the UE to temporarily suspend an uplink transmission on the source CC during the transmission of the SRS resource set on the target CC, wherein when the UE supports staying on the target CC for SRS switching, the processing circuitry is configured to encode signalling for transmission to a gNB indicating that the UE supports the staying on target CC for SRS switching as part of a carrier aggregation capability.

11. The non-transitory computer-readable storage medium of claim 10, wherein when the UE supports staying on the target CC for SRS switching, the processing circuitry is to configure the UE to:

stay on the target CC during a period between the SRS resource set transmissions if a time between the SRS resource set transmissions is smaller than an RF switching time for the UE to switch to the source CC and back to the target CC and a higher priority UL transmission and/or DL reception is not scheduled on the source CC in the period between the SRS resource set transmissions.

12. The non-transitory computer-readable storage medium of claim 11, wherein when the UE does not support staying on the target CC for SRS switching, the processing circuitry is to configure the UE to switch back to the source CC between the SRS resource set transmissions.

13. The non-transitory computer-readable storage medium of claim 12, wherein the processing circuitry is further configured to decode radio resource control (RRC) signalling received from the gNB to configure the UE for the SRS carrier switching.

14. The non-transitory computer-readable storage medium of claim 13, wherein the processing circuitry is further configured to suspend an uplink transmission on the source CC during an interruption due to RF retuning time when switching from the source CC to the target CC.

15. The non-transitory computer-readable storage medium of claim 14 wherein the processing circuitry is configured to apply dropping rules and/or timelines to target-source CC pairs for SRS carrier switching.

16. The non-transitory computer-readable storage medium of claim 14, wherein for the aperiodic SRS transmissions, the processing circuitry is to configure the UE to commence transmission of the SRS resource set based on timing of the DCI.

17. The non-transitory computer-readable storage medium of claim 12, when the UE supports the staying on the target CC for SRS switching, the processing circuitry is to configure the UE to:

switch back to the source CC between the SRS resource set transmissions when a higher priority UL transmission and/or DL reception is scheduled on the source CC in the period between the SRS resource set transmissions.

18. A method performed by processing circuitry of a user equipment (UE) configured for operation in a fifth-generation new radio (5G NR) network, the method comprising:

decoding a downlink control information (DCI) format triggering aperiodic sounding reference signal (SRS) transmission;

when the UE is configured for SRS carrier switching and a serving cell is not configured for a physical uplink shared channel (PUSCH) transmission, configuring the UE for the aperiodic SRS transmission including:

transmitting an SRS resource set on a target component carrier (CC);

switching to a source CC; and switching back to the target CC, causing the UE to temporarily suspend an uplink transmission on the source CC during the transmission of the SRS resource set on the target CC, and wherein when the UE supports staying on the target CC for SRS switching, the method further comprises configuring the UE to:

stay on the target CC during a period between the SRS resource set transmissions if a time between the SRS resource set transmissions is smaller than an RF switching time for the UE to switch to the source CC and back to the target CC and a higher priority UL transmission and/or DL reception is not scheduled on the source CC in the period between the SRS resource set transmissions.

* * * * *